US011461544B2

(12) United States Patent
Sarkar et al.

(10) Patent No.: US 11,461,544 B2
(45) Date of Patent: Oct. 4, 2022

(54) SPREADSHEET WITH REUSE FUNCTIONALITY

(71) Applicant: Microsoft Technology Licensing, LLC, Redmond, WA (US)

(72) Inventors: Advait Sarkar, Cambridge (GB); Andrew Donald Gordon, Cambridge (GB); John Herbert Martin Williams, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/848,753

(22) Filed: Apr. 14, 2020

(65) Prior Publication Data

US 2021/0256205 A1    Aug. 19, 2021

(30) Foreign Application Priority Data

Feb. 17, 2020 (GB) ...................................... 2002163

(51) Int. Cl.
*G06F 40/18* (2020.01)
*G06F 3/04817* (2022.01)
*G06F 3/0482* (2013.01)
*G06F 40/174* (2020.01)

(52) U.S. Cl.
CPC ............ *G06F 40/18* (2020.01); *G06F 3/0482* (2013.01); *G06F 3/04817* (2013.01); *G06F 40/174* (2020.01)

(58) Field of Classification Search
CPC .... G06F 40/18; G06F 3/04817; G06F 3/0482; G06F 40/174
See application file for complete search history.

(56) References Cited

U.S. PATENT DOCUMENTS

| | | |
|---|---|---|
| 7,117,435 B1 | 10/2006 | Kotler et al. |
| 8,055,995 B2 | 11/2011 | Sambandam et al. |
| 8,190,987 B2 | 5/2012 | Campbell et al. |
| 8,862,979 B2 | 10/2014 | Hawking |
| 9,483,456 B2 | 11/2016 | Honsowetz |
| 9,798,889 B1 | 10/2017 | Karpel et al. |
| 9,922,019 B2 | 3/2018 | Bauchot |
| 2004/0103366 A1 | 5/2004 | Peyton-jones et al. |

(Continued)

FOREIGN PATENT DOCUMENTS

WO    2020005652 A1    1/2020

OTHER PUBLICATIONS

"Apache OpenOffice Calc", Retrieved from: https://web.archive.org/web/20150105035347/https:/www.openoffice.org/product/calc.html, Jan. 5, 2015, 2 Pages.

(Continued)

*Primary Examiner* — John T Repsher, III

(57) ABSTRACT

A spreadsheet application displays a spreadsheet of cells in tabular form. User input is received specifying an input range of cells of the spreadsheet, a destination range of cells of the spreadsheet and a local modification. A memory stores a representation of the spreadsheet indicating formatting, values and formulas. An update of the representation is computed by applying the local modifications to the representation. Values of cells of the input range of the spreadsheet are calculated by using the updated representation and the calculated values are displayed at the destination range.

20 Claims, 16 Drawing Sheets

(56) References Cited

U.S. PATENT DOCUMENTS

| | | | |
|---|---|---|---|
| 2005/0223051 A1* | 10/2005 | Arakaki | G06F 40/18 |
| | | | 708/490 |
| 2006/0136808 A1* | 6/2006 | Chirilov | G06F 40/18 |
| | | | 715/217 |
| 2007/0219956 A1 | 9/2007 | Milton | |
| 2008/0168341 A1* | 7/2008 | Payette | G06F 40/18 |
| | | | 715/212 |
| 2009/0006939 A1* | 1/2009 | DeSpain | G06F 40/18 |
| | | | 715/217 |
| 2009/0182763 A1* | 7/2009 | Hawking | G06F 16/176 |
| 2012/0137203 A1 | 5/2012 | Schoedl | |
| 2013/0104020 A1* | 4/2013 | Patterson | G06F 40/18 |
| | | | 715/219 |
| 2014/0372952 A1 | 12/2014 | Otero et al. | |
| 2018/0121667 A1* | 5/2018 | Karpel | G06F 40/18 |
| 2020/0004811 A1 | 1/2020 | Gross et al. | |
| 2020/0065365 A1* | 2/2020 | Pulaski | G06Q 10/00 |

OTHER PUBLICATIONS

Abadi, et al., "A Theory of Objects", In Book Monographs in Computer Science, Sep. 1996.

Abraham, et al., "Inferring templates from spreadsheets", In Proceedings of the 28th international conference on Software engineering, May 20, 2006, pp. 182-191.

Abraham, et al., "Type inference for spreadsheets", In Proceedings of the 8th ACM SIGPLAN international conference on Principles and practice of declarative programming, Jul. 10, 2006, pp. 73-84.

Blackwell, et al., "A Cognitive Dimensions questionnaire optimised for users", In Proceedings of 12th Annual Workshop on Psychology of Programming Interest Group, vol. 13, Apr. 2000, pp. 137-154.

Bock, et al., "Concrete and abstract cost semantics for spreadsheets", In IT University Technical Report Series, Dec. 2018, 65 Pages.

Bostock, et al., "Protovis: A Graphical Toolkit for Visualization", In Proceedings of IEEE Transactions on Visualization and Computer Graphics, vol. 15, Issue 6, Nov. 2009, pp. 1121-1128.

Burnett, et al., "Forms/3: A first-order visual language to explore the boundaries of the spreadsheet paradigm", In Journal of Functional Programming, vol. 11, Issue 2, Mar. 2001, pp. 1-51.

Chambers, et al., "Customization: Optimizing compiler technology for self, A dynamically-typed object-oriented programming language", In ACM SIGPLAN Conference on Programming Language Design and Implementation, Jul. 1989, pp. 295-312.

Cheng, et al., "Static analysis of spreadsheet applications for type-unsafe operations detection", In European Symposium on Programming Languages and Systems, Apr. 11, 2015, pp. 26-52.

Clack, et al., "Object-oriented functional spreadsheets", In Proceedings of the 10th Glasgow Workshop on Functional Programming, Sep. 1997, 16 Pages.

Djang, et al., "Similarity inheritance: a new model of inheritance for spreadsheet VPLS", In Proceedings of IEEE Symposium on Visual Languages, Sep. 1, 1998, 8 Pages.

Williams, et al. "Higher-Order Spreadsheets with Spilled Arrays", In Proceedings of European Symposium on Programming, Apr. 27, 2020, pp. 743-769.

Erwig, et al., "Automatic generation and maintenance of correct spreadsheets", In Proceedings of the 27th International conference on Software engineering, May 15, 2005, pp. 136-145.

Green, T. R. G, "Cognitive dimensions of notations", In Proceedings of the fifth conference of the British Computer Society, Human-Computer Interaction Specialist Group on People and computers V, Sep. 5, 1989, pp. 1-14.

Green, et al., "Usability Analysis of Visual Programming Environments: A 'Cognitive Dimensions' Framework", In Journal of Journal of Visual Languages & Computing vol. 7, Issue 2, Jun. 1, 1996, pp. 131-174.

Hall, et al., "Structuring Spreadsheets with the "Lish" Data Model", In Journal of Computing Research Repository, Jan. 2018, 13 Pages.

Hartmann, et al., "Authoring sensor-based interactions by demonstiation with direct manipulation and pattern recognition", In Proceedings of the SIGCHI Conference on Human Factors in Computing Systems, Apr. 28, 2007, pp. 145-154.

Jelen, Bill, "Excel Dynamic Arrays Straight to the Point", In Publication of Holy Macro! Books, Sep. 24, 2018, 11 Pages.

Tanimoto, Steven L.., "VIVA: A visual language for image processing", In Journal of Visual Languages & Computing vol. 1, Issue 2, Jun. 1, 1990.

Jones, et al., "A user-centred approach to functions in Excel", In Proceedings of the eighth ACM SIGPLAN international conference on Functional programming, Aug. 2003, pp. 165-176.

Levoy, Marc, "Spreadsheets for images", In Proceedings of the 21st annual conference on Computer graphics and interactive techniques, Jul. 24, 1994, 8 Pages.

Mccutchen, et al., "Elastic Sheet-Defined Functions: Generalising Spreadsheet Functions to Variable-Size Input Arrays", In Proceedings of ACM Program Language, vol. 1, Mar. 2019, 44 Pages.

Mccutchen, et al., "Object spreadsheets: a new computational model for end-user development of data-centric web applications", In Proceedings of the ACM International Symposium on New Ideas, New Paradigms, and Reflections on Programming and Software, Oct. 2016, pp. 112-127.

Miller, et al., "Gradual structuring: Evolving the spreadsheet paradigm for expressiveness and learnability", In Proceedings of 15th International Conference on Information Technology Based Higher Education and Training (ITHET), Sep. 8, 2016, 8 Pages.

Mokhov, et al., "Build systems a la carte", In Proceedings of International Conference on Functional Programming, Sep. 2018, 29 Pages.

Nielsen, et al., "Heuristic evaluation of user interfaces", In Proceedings of the SIGCHI Conference on Human Factors in Computing Systems, Apr. 1990, pp. 249-256.

Piersol, Kurt W., "Object-oriented spreadsheets: the analytic spreadsheet package", In ACM SIGPLAN Notices, Sep. 1986, pp. 385-390.

Sarkar, et al., "Calculation View: multiple-representation editing in spreadsheets", In IEEE Symposium on Visual Languages and Human-Centric Computing (VL/HCC), Oct. 1, 2018, pp. 85-93.

Sestoft, Peter, "Implementing function spreadsheets", In Proceedings of the 4th international workshop on End-user software engineering, May 12, 2008, pp. 91-94.

Tukiainen, Markku, "Evaluation of the Cognitive Dimensions Questionnaire and Some Thoughts about the Cognitive Dimensions of Spreadsheet Calculation", In Proceedings of 13th Workshop of the Psychology of Programming Interest Group, Jan. 2001, pp. 1-7.

Sestoft, et al., "Sheet-defined functions: implementation and initial evaluation", In International Symposium on End User Development, Jun. 10, 2013, pp. 1-16.

Yang, et al., "Representation design benchmarks: a design-time aid for VPL navigable static representations", In Journal of Visual Languages & Computing, vol. 08, Issue 5-6, Dec. 1, 1997, pp. 563-599.

Ilker, "All you need to know about Excel's New Spill Feature", Retrieved from: https://www.spreadsheetweb.com/excel-spill/, Feb. 21, 2019, 6 Pages.

Joharizadeh, et al., "Gridlets: Reusing Spreadsheet Grids", In Proceedings of Extended Abstracts of the CHI Conference on Human Factors in Computing Systems, Apr. 25, 2020, 7 Pages.

"International Search Report and Written Opinion Issued in PCT Application No. PCT/US21/014034", dated May 11, 2021, 16 Pages.

* cited by examiner

| MORTGAGE CALCULATOR | | |
|---|---|---|
| MORTGAGE DETAILS | | |
| LOAN AMOUNT | £150,000.00 | |
| DEPOSIT | £10,000.00 | |
| TERM (YEARS) | 30 | |
| INTEREST RATE | 3.4% | |
| FINANCED AMOUNT | £140,000.00 | |
| MONTHLY REPAYMENT | £620.87 | |
| TOTAL REPAID | £223,514.54 | |
| TOTAL INTEREST | £83,514.54 | |

GIVE THE GRIDLET A NAME

MORTGAGE REPAYMENT CALCULATOR

900

GRIDLETS
NEW GRIDLET

SPREADSHEET WITH REUSE FUNCTIONALITY

BACKGROUND

Spreadsheet applications are widely used to enable end users to work with data in tabular form. A spreadsheet application comprises one or more spreadsheets having rows and columns of cells able to hold values such as text, numbers or other data. End users are able to organize and analyze data in tabular form by operating the spreadsheet. Built-in formulas, pivot tables, formatting functionality and facility to create graphs and charts makes spreadsheet applications extremely useful.

Spreadsheets allow end users to blend calculations with layout and formatting. However, when it comes to reusing areas of a spreadsheet existing applications provide only limited support. Most users rely on copy and paste, which is easy to learn and use, but is often tedious and error prone.

The embodiments described below are not limited to implementations which solve any or all of the disadvantages of known spreadsheet applications.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples a spreadsheet application displays a spreadsheet of cells in tabular form. User input is received specifying an input range of cells of the spreadsheet, a destination range of cells of the spreadsheet and a local modification. A memory stores a representation of the spreadsheet indicating formatting, values and formulas. An update of the representation is computed by applying the local modifications to the representation. Values of cells of the input range of the spreadsheet are calculated by using the updated representation and the calculated values are displayed at the destination range.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 9 is a schematic diagram of a graphical user interface showing a user naming a gridlet;

FIG. 12 is a schematic diagram of an area of a spreadsheet with content and of an instance of a gridlet;

Like reference numerals are used to designate like parts in the accompanying drawings.

DETAILED DESCRIPTION

Figure 1:
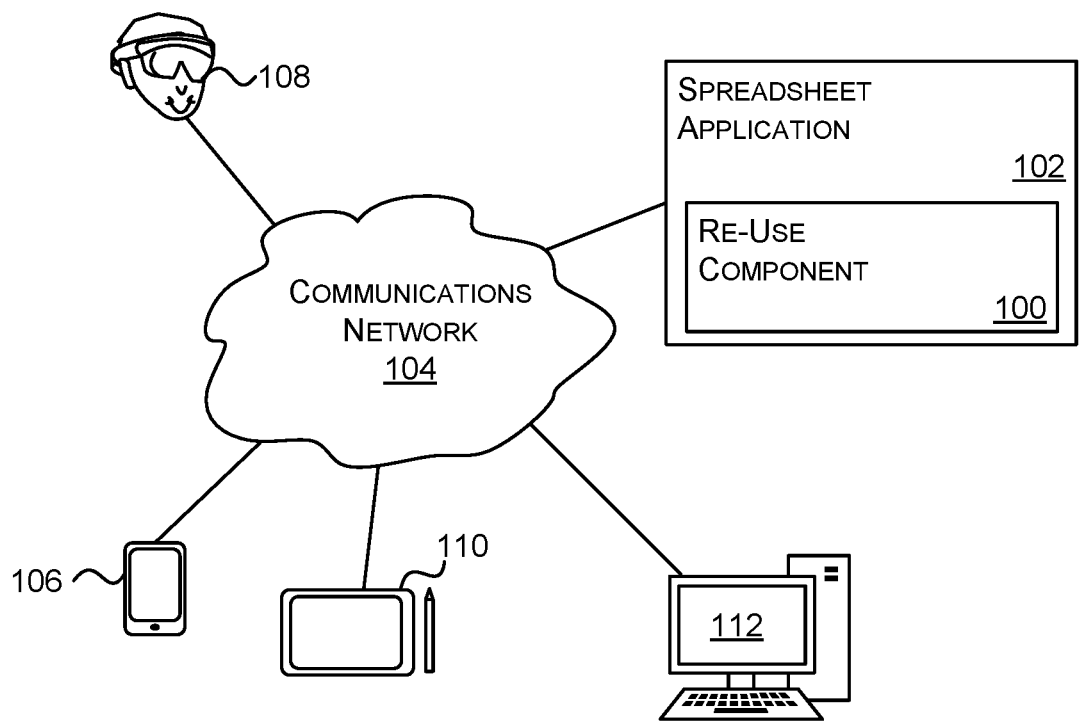
FIG. 1 is a schematic diagram of a spreadsheet application with a reuse component, where the spreadsheet application is deployed as a cloud service.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As mentioned above, a spreadsheet application displays a spreadsheet of cells in tabular form. Suppose there is an area in the spreadsheet that a user wants to reuse. The user is able to copy and paste the area and does so to create three copies of the area. Later, if the user makes a change to formatting, values or formulas of the area, those changes do not carry over to the three copies. The user has to manually identify the three copies and manually make the changes to formatting, values or formulas of the copies. It is time consuming, burdensome and error prone to make the manual identification and updates.

Suppose the user wants the functionality and formatting of the spreadsheet area to be available in the copies, but wants at least some local content in the individual copies to be bespoke to the respective copy. The user is able to make manual edits to one or more of the three copies. Now when the user wants to make a change in the original spreadsheet area and have that carry over to the copies, the user is faced with even more complexity, because the user has to distinguish between parts of the copies which are to be congruent with the original area and parts of the copies which are locally unique.

In various examples described herein a spreadsheet application has a reuse component that enables a user to reuse areas of a spreadsheet in a simple and effective manner, with reduced burden of user input and with reduced likelihood of errors. The reuse component is a software add-in to the spreadsheet application in some cases. Using a software add-in enables the reuse functionality to be applied to existing spreadsheets and spreadsheet applications. In other cases the reuse component is a modified spreadsheet application. Deploying a modified spreadsheet application enables the reuse functionality to be widely available. The reuse component enables the spreadsheet application to have an improved human-machine interface. The reuse component improves efficiency.

In some examples the spreadsheet application understands a new type of formula referred to herein as a gridlet instance formula and which is used to enable the reuse functionality. Using formulas for gridlet instances is a powerful way to enable expert end users to operate the reuse functionality and enables reuse to be expressed in a compact, accurate form suitable for transfer between different spreadsheets.

In some examples the spreadsheet application or software add-in, is configured with graphical user interface functionality to implement the reuse facility. Using graphical user interface functionality to implement the reuse facility is an intuitive and easy to operate approach suitable for novice users as well as expert users.

A gridlet is a specification of an area of a spreadsheet comprising a plurality of cells potentially to be copied (where formatting, values and formulas are to be copied) together with a specification of cells of the area where potential local modifications are possible.

A gridlet instance is a specification of an area of a spreadsheet to be copied (where formatting, values and formulas are to be copied), a specification of a local modification to be made to the area of the spreadsheet once copied, and a specification of a destination range of cells of the spreadsheet.

FIG. 1 is a schematic diagram of a spreadsheet application 102 with a reuse component 100 deployed at a web server. The web server is in communication with various client devices via a communications network 104 such as the internet or any other communications network. Client computing devices such as smart phone 106, head worn augmented reality computing device 108, tablet computer 110, desk top computer 112 are able to access the spreadsheet application 102 and reuse component 100 via communications network 104. In this way the spreadsheet application 102 and reuse component 100 are deployed as a cloud service.

It is not essential to use a cloud service deployment as in FIG. 1. In other examples the spreadsheet application 102 and/or reuse component 100 are installed locally at each of computing devices 106, 108, 110, 112.

The spreadsheet application 102 and/or reuse component 100 comprise functionality that is deployed in whole or in part at either or both of a client and server computer.

The reuse component of the disclosure operates in an unconventional manner to enable a user to reuse areas of a spreadsheet in an efficient manner whilst allowing local modifications. A representation of the spreadsheet holds an association between an input range, a destination range and a local modification.

A reuse component of a spreadsheet application "improves the functioning of the underlying computing device" by computing a representation of a spreadsheet according to an association between an input range, a destination range and a local modification. Where edits are made to the spreadsheet within the input range, the edits propagate to the destination range and take the local modification into account.

Alternatively, or in addition, the functionality of the reuse component 100 is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
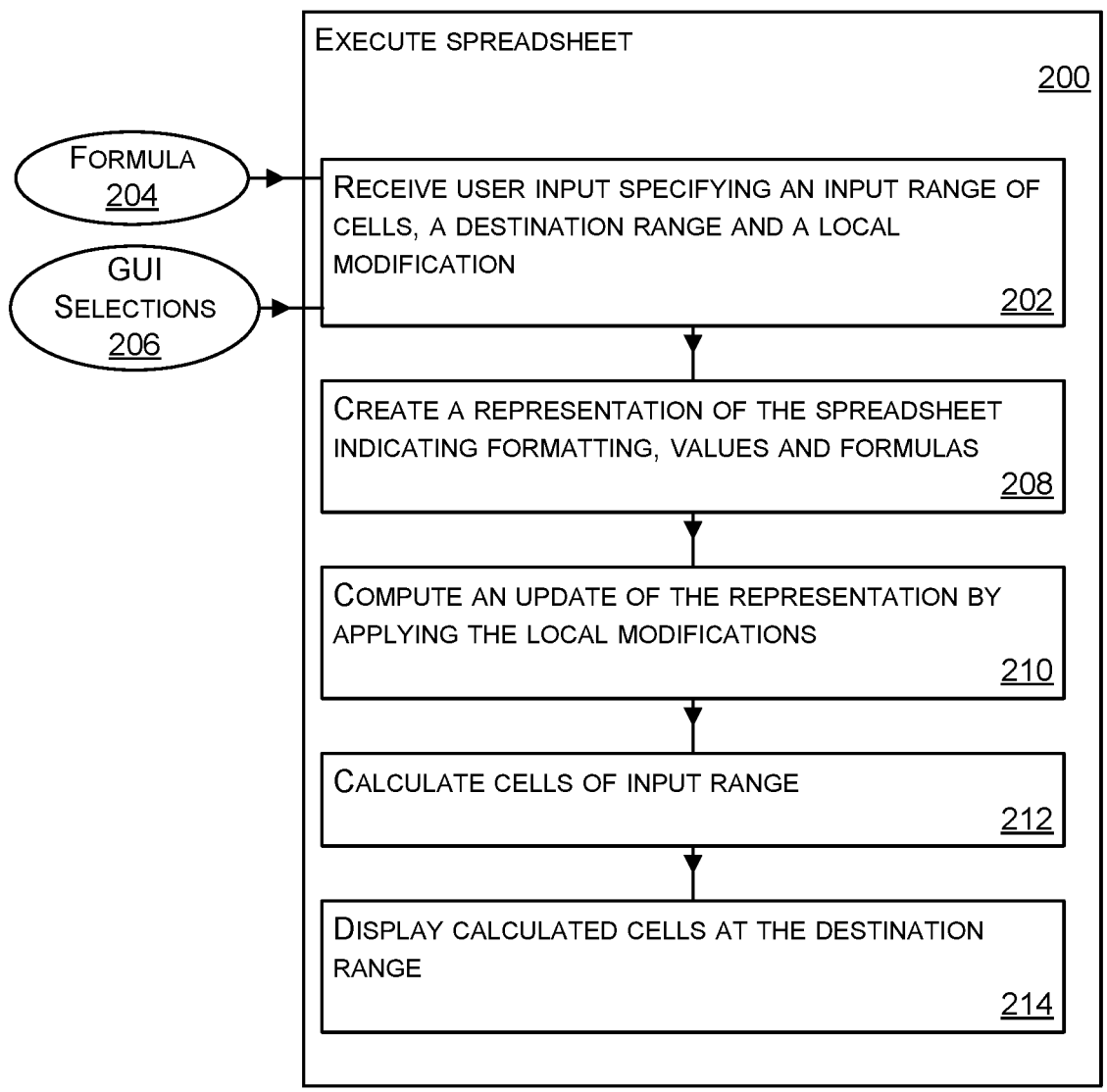
FIG. 2 is a flow diagram of a method of operation at a spreadsheet application with a reuse component.

FIG. 2 is a flow diagram of a method of operation at a reuse component 100 of a spreadsheet application 102. The method creates a gridlet instance.

With reference to FIG. 2, the spreadsheet application 102 is executing 200 and displays a spreadsheet which has at least one area of content. In an example described below the area of content is a mortgage calculator which a user has spent considerable time and effort creating. However, the scope is not limited to mortgage calculators as any area of content is used. The area of content comprises formatting, values and optionally formulas.

A user desires to create a gridlet instance. The reuse component 100 receives 202 user input specifying an input range of cells, a destination range of cells and a local modification. In some cases a formula 204 is entered by the user to express the input range of cells, the destination range of cells and the local modification. In some cases graphical user interface (GUI) selections 206 are made by the user to specify the input range of cells, destination range of cell and local modification.

The input range of cells is the area of the spreadsheet that the user wants to copy. The destination range of cells is an area of a spreadsheet where the gridlet instance is to be placed. In some cases the destination range of cells is expressed as a single cell and array spilling is used by the reuse component and/or spreadsheet application. Array spilling is where an array, when pasted into a cell, spills below and to the right of the cell.

The local modification comprises at least one change to be applied to any of: formatting, values, content, of the input range of cells. In the mortgage calculator example described below, the local modification comprises changes to a value expressing an amount to be borrowed.

With reference to FIG. 2, the reuse component creates 208 a representation of the spreadsheet indicating formatting, values and formulas. The representation is preferably computed in a compressed form, eliminating redundancy where possible, in order to give efficiency to the reuse component. The representation of the spreadsheet comprises formulas, values, and formatting of the entire spreadsheet (but not computed values that result from formulas). In some embodiments the representation is pruned by removing information that the input range does not require, which is identified by computing a dependency analysis of the input range which works in most cases. In some cases an input range depends on all the other cells, or there is a formula that uses a function such as RAND, INDIRECT, OFFSET, which prevents a dependency analysis of the input range and in such cases a snapshot of the entire spreadsheet is taken. The representation comprises a snapshot of not just the values, but formulas, values and formatting; not just of the input range but of the entire spreadsheet.

The reuse component computes 210 an update of the representation by applying the local modifications. That is, the reuse component applies the local modifications, which were received from the user input at operation 202, to the input range of the representation.

The reuse component calculates 212 the cells of the input range from the updated representation. The calculation produces the formatting, values and any formulas for the gridlet instance. The reuse component displays 214 the calculated cells at the destination range by using array spilling or in any other way. In this way the gridlet instance is displayed in the destination range.

The spreadsheet application continues to execute. Suppose that the user now makes an edit within the input range of cells in the spreadsheet. The user edits any of the formatting, values, formulas of the input range of cells in the spreadsheet. These edits carry over automatically to the gridlet instance without the user needing to do anything. Automatic carry over of the edits is achieved since the representation computed at operation 208 contains the dependency between the input range of cells, the destination range and the local modification according to the user input at operation 202. The local modifications are still applied according to the process of FIG. 2. That is, if the user makes an edit in the input range which is in a location that will be overwritten by the local modification, then it is overwritten by the local modification In another example, the reuse component stores 300 gridlet instance data. The gridlet instance data is, for each gridlet instance: the input range of cells, the destination range of cells and the local modification. The reuse component monitors 302 the spreadsheet and when it detects a change in formatting or content or formulas in a gridlet instance input range it moves to operation 306. If no such change is detected the reuse component continues to monitor the spreadsheet.

At operation 306 the reuse component makes a decision as to whether or not a global edit is intended. In some cases the decision is made according to user input; that is, the reuse component asks the user whether or not a global edit is intended. In some cases the decision is made automatically according to one or more factors such as a user profile, configuration settings in the reuse component, historical data about operation of the reuse component or other factors.

If the output of the decision is that a global edit is intended then the reuse component updates 308 all instances of the gridlet in the spreadsheet according to the detected change and taking into account the specified local modifications of the gridlet instances.

Figure 3:
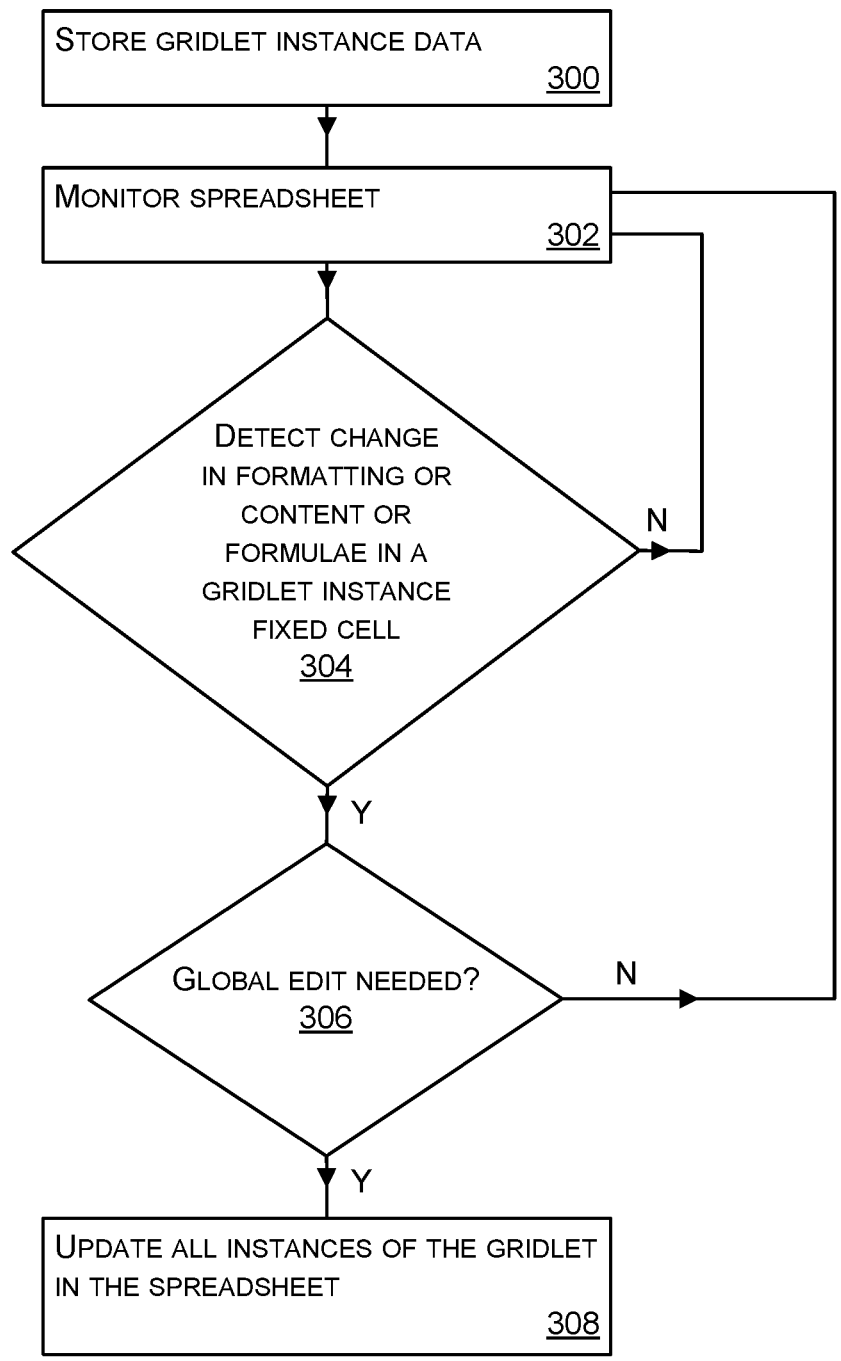
FIG. 3 is a flow diagram of a method of making global edits to a gridlet.

If the output of the decision is that a global edit is not intended then the method of FIG. 3 returns to operation 302 where the spreadsheet is monitored.

Figure 4:
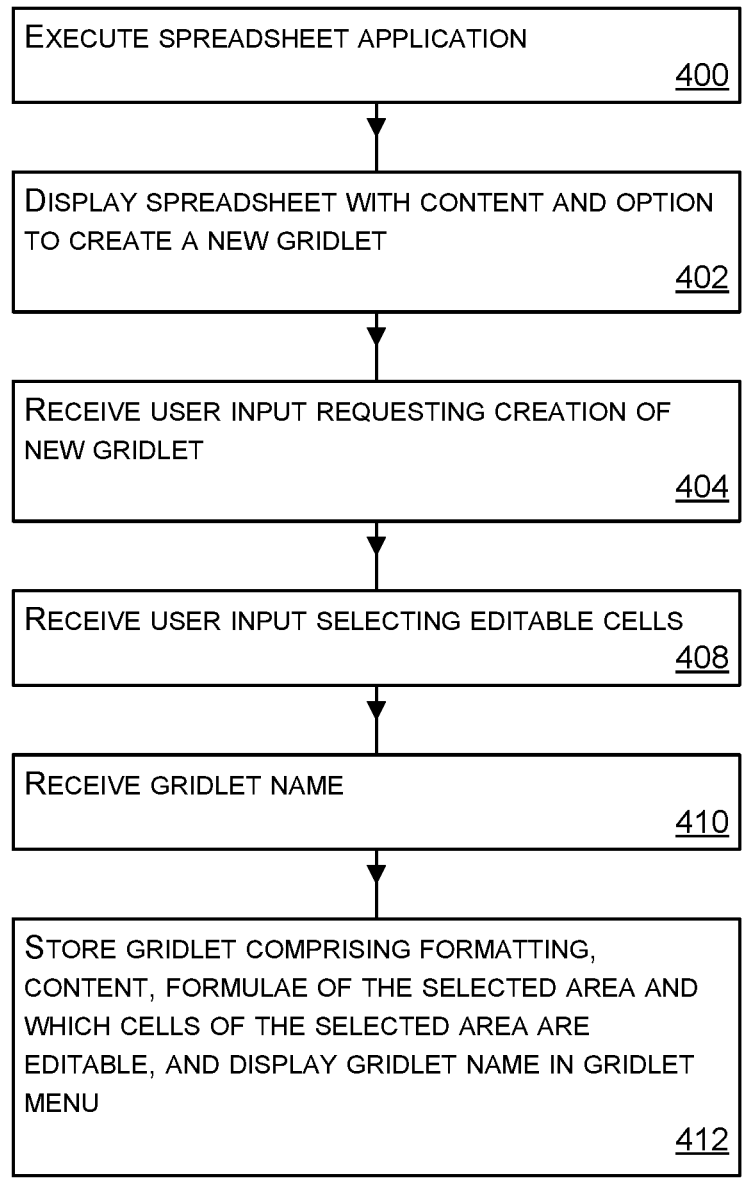
FIG. 4 is a flow diagram of a method of operation using a graphical user interface, for creating a new type of gridlet.

As mentioned above there are some embodiments where graphical user interface input is used to create new gridlets and/or gridlet instances. FIG. 4 is a flow diagram of a method where a new gridlet is created using a GUI.

With reference to FIG. 4 a spreadsheet application executes 400 and displays 402 a spreadsheet with content and a graphical user interface element, such as a menu item, button, icon or other element, for creating a new gridlet. A reuse component such as reuse component 100 receives 404 user input requesting creation of a new gridlet such as by a user selecting the graphical user interface element for a new gridlet. The reuse component receives 406 user input selecting an area of the displayed spreadsheet; this area corresponds to the input range of cells mentioned in FIG. 2. The user input is a selection of a range of cells made using a cursor, or is a range of cells specified by a user typing in the range to the GUI or is any other suitable user input.

The reuse component receives user input selecting 408 editable cells of the area from operation 406. That is, some but not all of the cells of the input range are marked as being editable. The editable cells are an example of a potential local modification of FIG. 2.

The reuse component optionally receives 410 a name for the gridlet being created. It stores 412 the gridlet, comprising the input range of cells and which of those cells are potentially locally modifiable. The input range of cells comprises formatting, values and any formulas of the input range of cells. The gridlet name is optionally stored with the gridlet. The graphical user interface optionally displays the name of the gridlet and an icon representing the gridlet in a gridlet pane or menu of the spreadsheet application. A user is able to select the icon or menu entry in order to create a new instance of the gridlet as explained with reference to FIG. 5.

Figure 5:
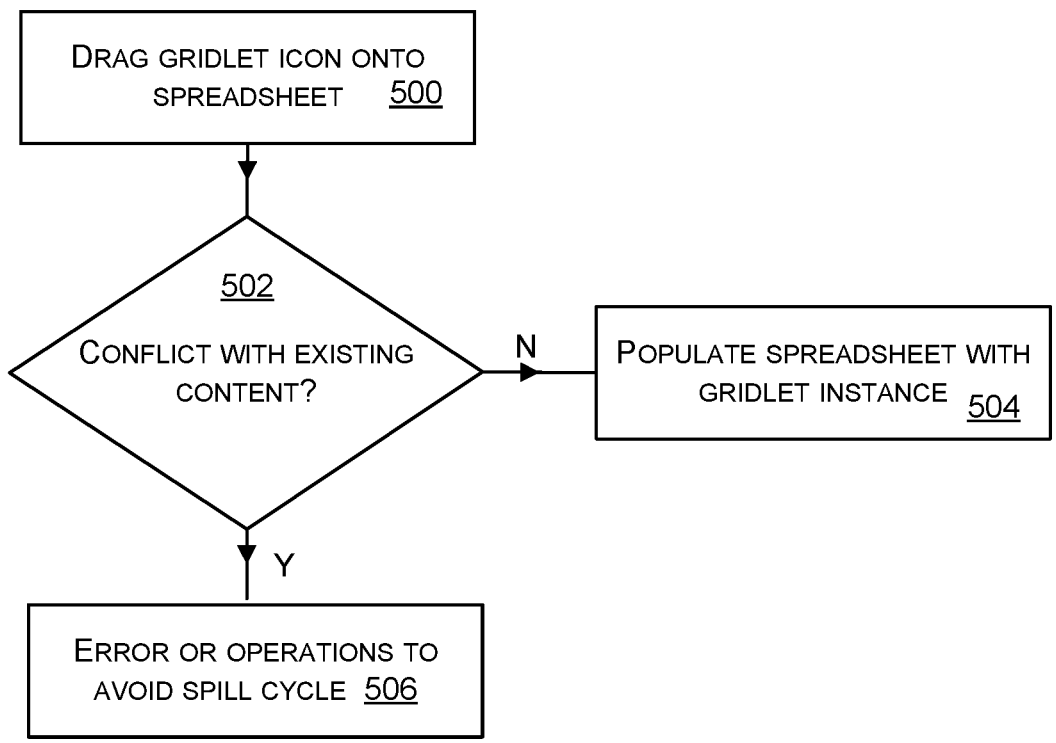
FIG. 5 is a flow diagram of a method of instantiating a gridlet instance using a graphical user interface.

With reference to FIG. 5 a GUI is used to enable a user to create an instance of a gridlet as follows. The user drags 500 a gridlet icon onto a spreadsheet and drops the gridlet icon at a cell. Using array spilling an instance of the gridlet corresponding to the gridlet icon is spilt into the spreadsheet. It is also possible to use menu selections or other graphical user interface operations to achieve the same result. Having said that, dragging and dropping has been found effective and intuitive in practice. Burden of user input is significantly reduced since gridlet instances are quickly and simply created in the spreadsheet by dragging and dropping without the need for the user to type in formulas. The gridlet instances update appropriately when edits are made as explained above with reference to FIGS. 2 and 3. The user is able to see at a glance what types of gridlet are available by viewing the gridlet icons in the gridlet pane or menu.

In various examples a check 502 is made for conflict with existing content in the spreadsheet. In some cases a conflict happens where there are already values in one or more cells of the destination range of a gridlet instance and this is referred to herein as a spill collision. A spill collision is detected by examining the spreadsheet. In other cases a conflict happens where a spill cycle occurs due to a value spilling into an area used to compute that value. Where a conflict is found comprising a spill collision an error is returned 506. Where a conflict is found comprising a spill cycle, a record is made of the cells required to compute a value and operations are executed 506 to ensure none of these cells are in the potential spill area. If there is no conflict the spreadsheet is populated 504 with the gridlet instance.

FIGS. 6 to 10 are graphical user interfaces illustrating a process for creating a new gridlet using graphical user interface selections.

Figure 6:
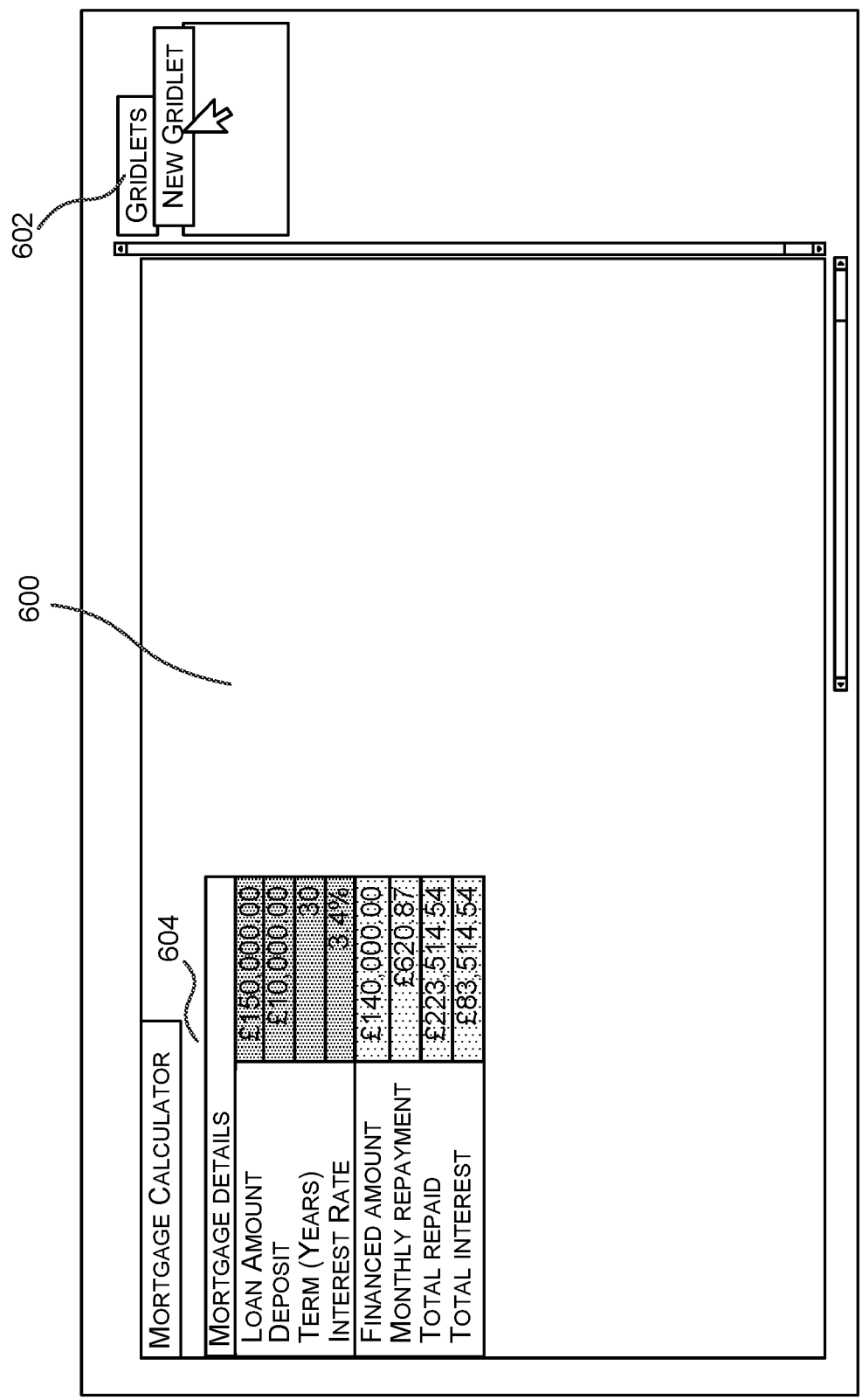
FIG. 6 is a schematic diagram of a graphical user interface showing part of a spreadsheet having content.

FIG. 6 is a schematic diagram of a graphical user interface showing part of a spreadsheet 600 of cells in columns and rows. A range of cells A1 to B11 comprises a mortgage calculator and is indicated by arrow 604. The mortgage calculator has two columns one containing text and one containing numbers. The mortgage calculator has formatting such as the font size and font type used, the color fill of some of the cells and the use of borders. The mortgage calculator has values such as the text and numerical values. The mortgage calculator has one or more formulas (not visible in FIG. 6) which are used to compute the numerical values displayed in some of the cells of the mortgage calculator. The graphical user interface comprises a menu 602 for gridlets having an entry "new gridlet". In the example of FIG. 6 a user selects the entry "new gridlet" with a cursor.

Figure 7:
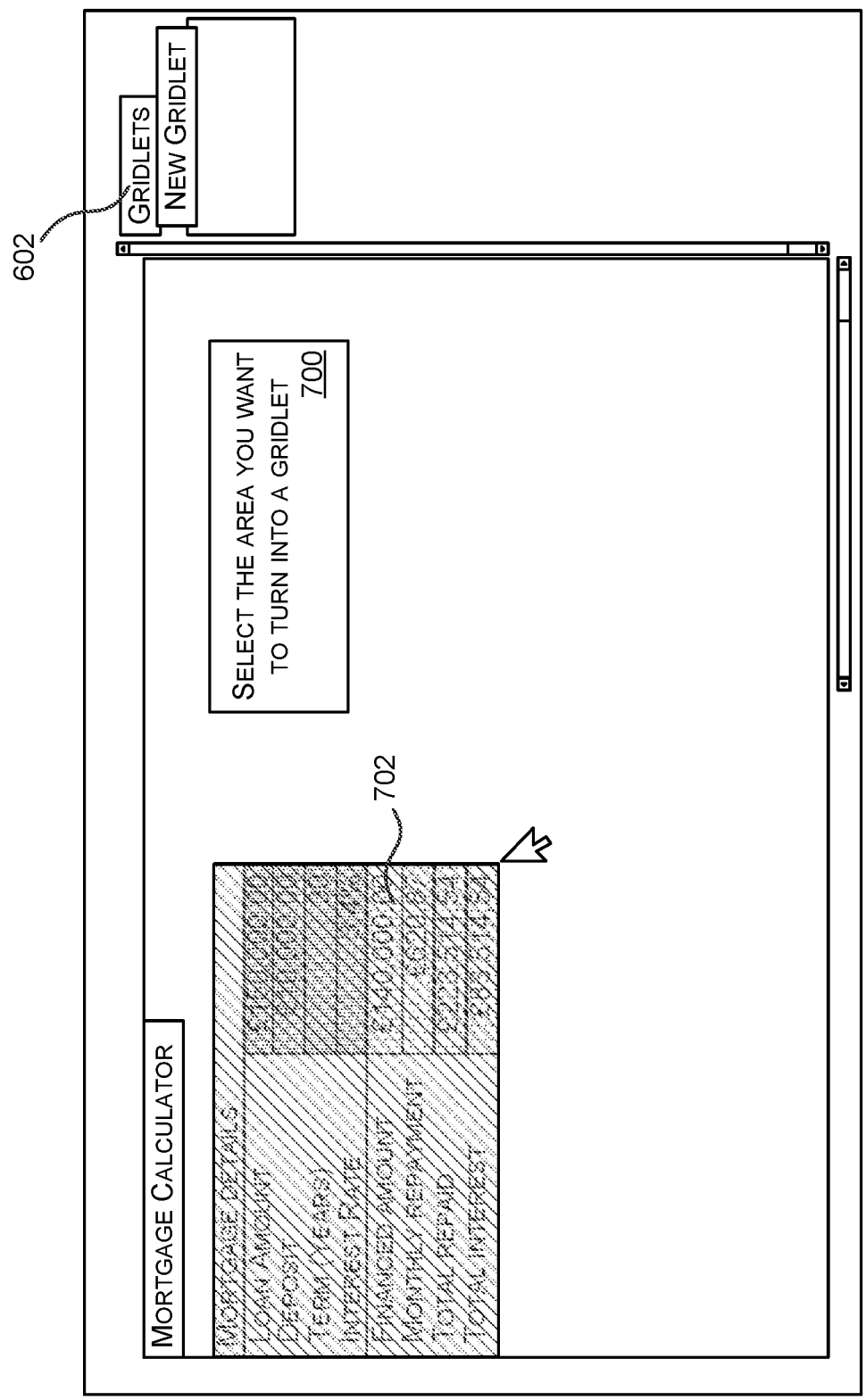
FIG. 7 is a schematic diagram of a graphical user interface showing a user selecting an area of a spreadsheet for turning into a gridlet.

FIG. 7 is a schematic diagram of a graphical user interface showing a user selecting an area 702 of a spreadsheet for turning into a gridlet. The area 702 is the same as the area of the mortgage calculator of FIG. 6 in this case. The graphical user interface displays a request 700 asking the user to "select the area you want to turn into a gridlet" and the user selects, using a cursor, the area 702 as indicated.

Figure 8:
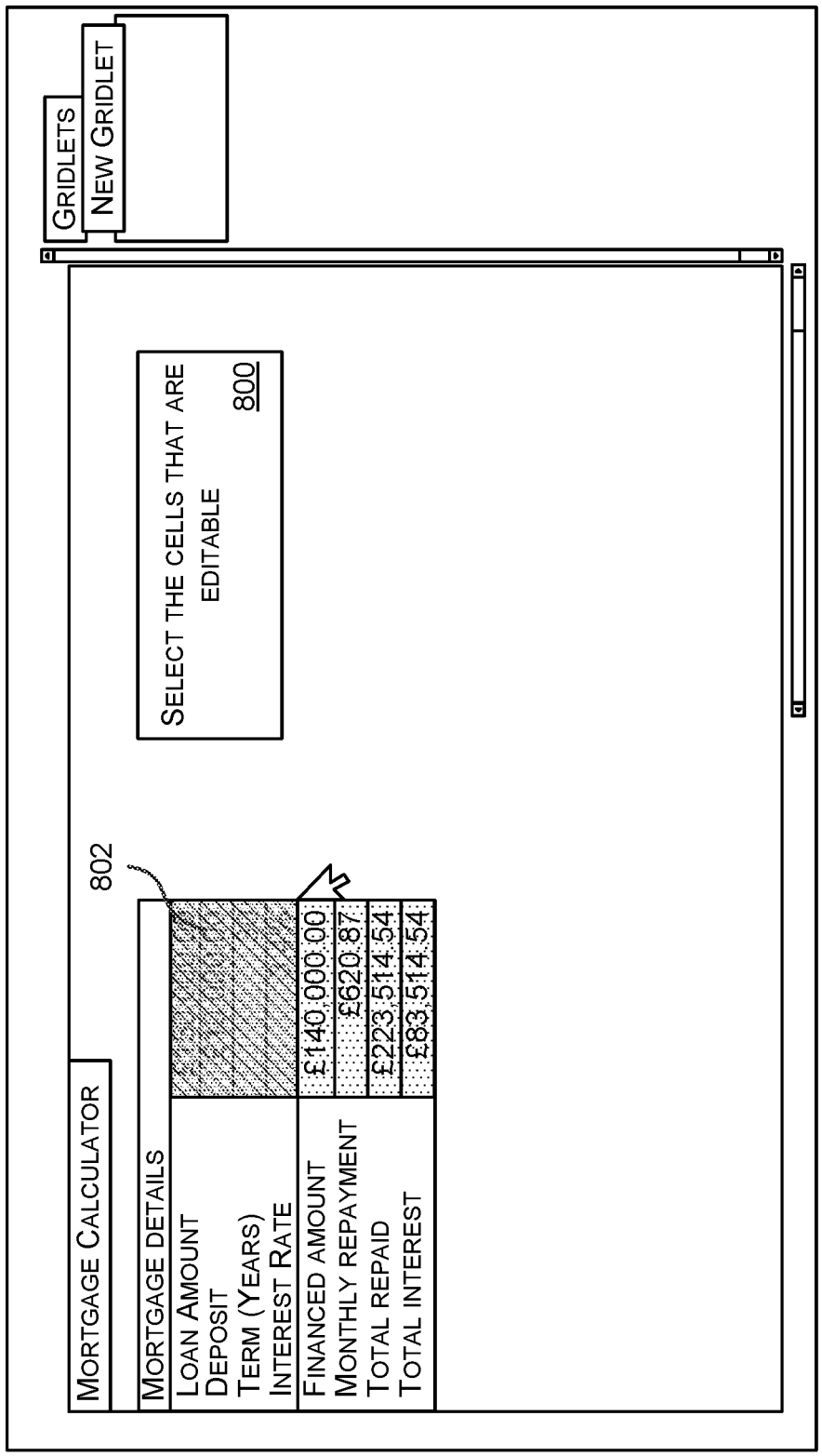
FIG. 8 is a schematic diagram of a graphical user interface showing a user selecting cells that are editable in a gridlet.

FIG. 8 is a schematic diagram of a graphical user interface showing a user selecting cells that are editable in a gridlet. The graphical user interface displays a request 800 for the user to "select the cells that are editable" and the user, in response, selects cells 802 in range B4 to B7. These are cells which are able to be locally modifiable in instances of the gridlet being created.

FIG. 9 is a schematic diagram of a graphical user interface showing a user naming a gridlet. The GUI displays a request 900 for the user to "give the gridlet a name" and in this example the user enters the name "mortgage repayment calculator".

Figure 10:
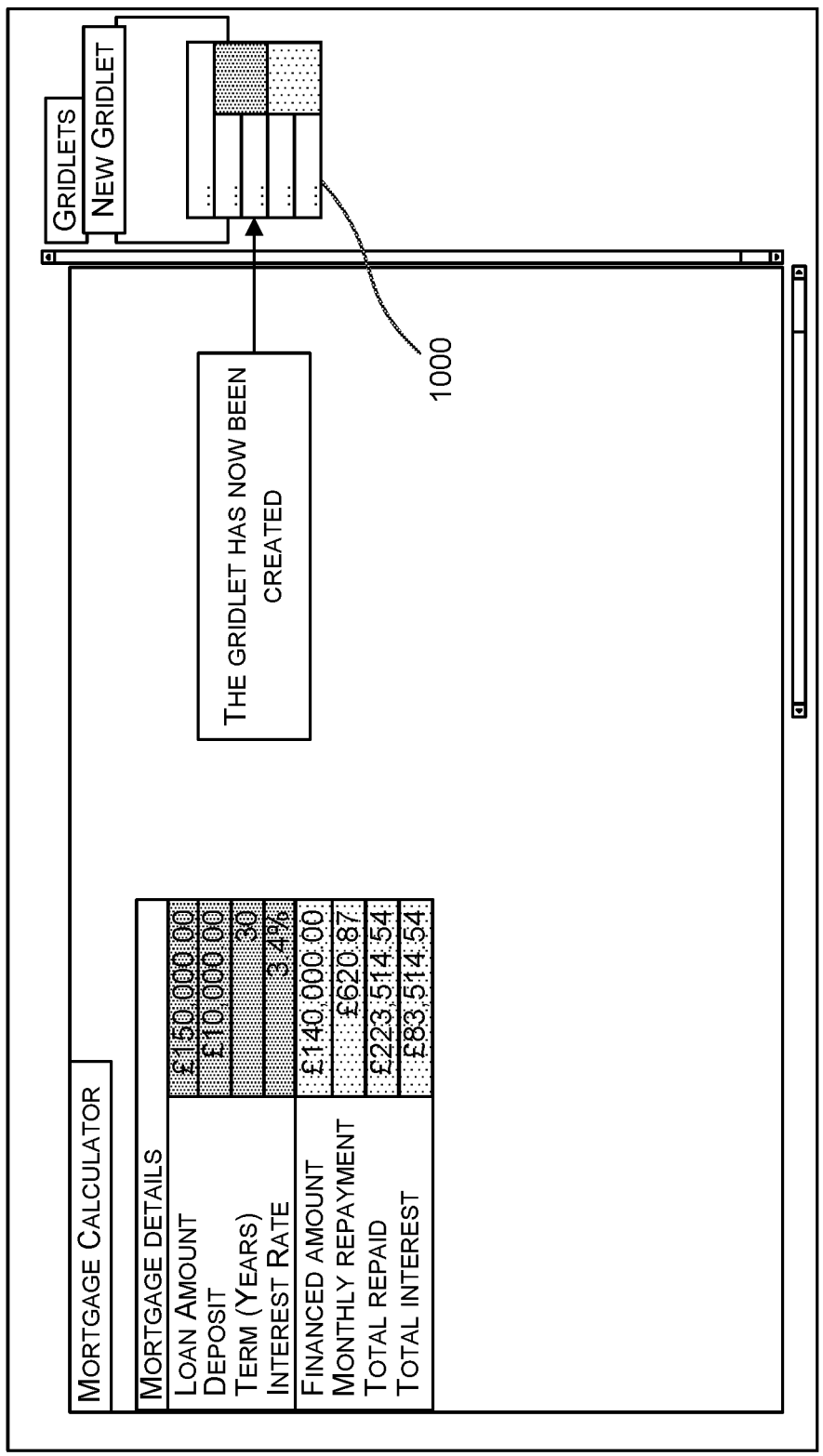
FIG. 10 is a schematic diagram of a graphical user interface showing a gridlet which has been created.

FIG. 10 is a schematic diagram of a graphical user interface showing a gridlet which has been created. The graphical user interface displays an indication that "the gridlet has now been created" and displays an icon 1000 representing the mortgage repayment calculator gridlet in the gridlets menu or pane.

Figure 11:
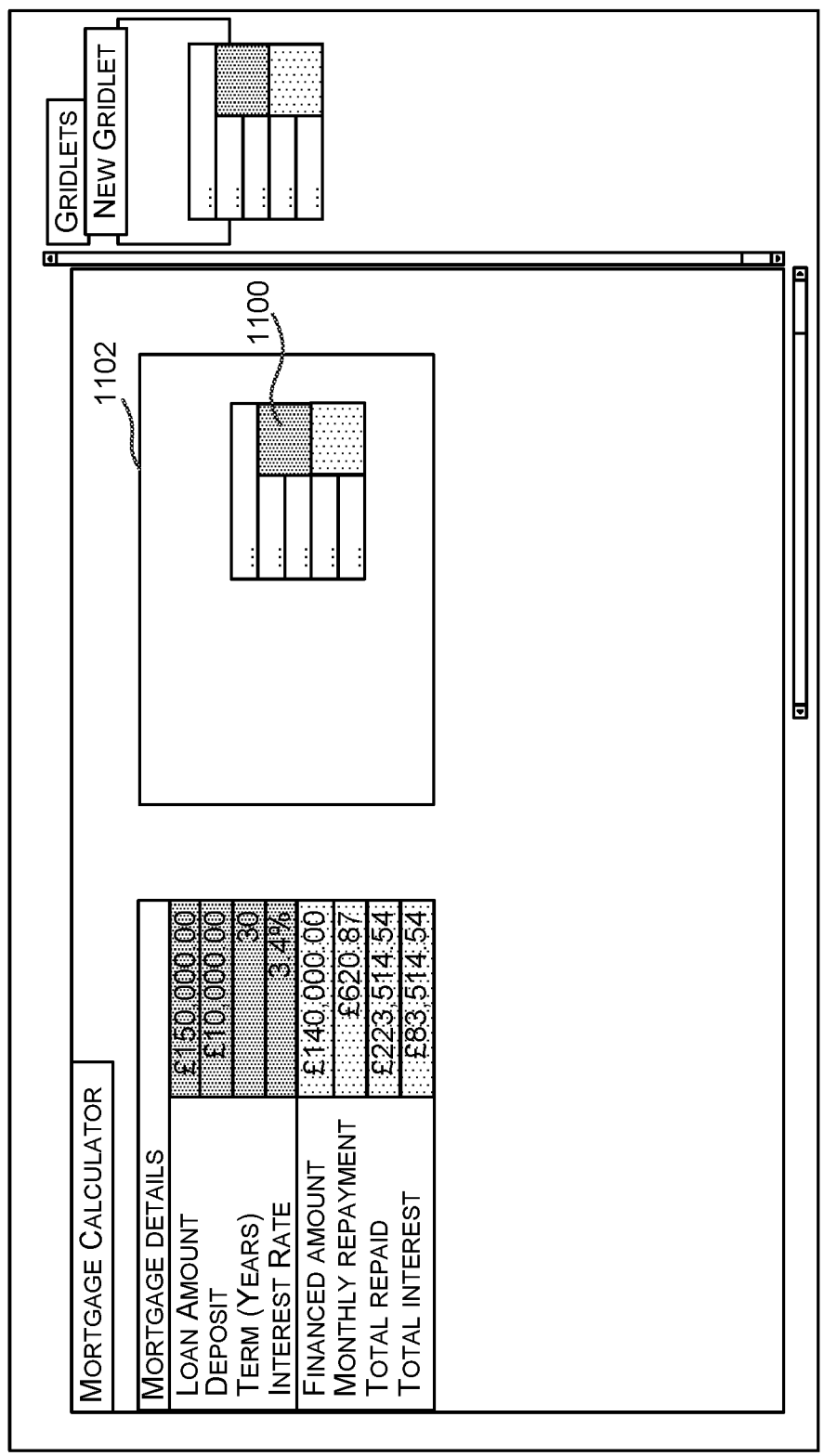
FIG. 11 is a schematic diagram of a graphical user interface showing a user instantiating an instance of a gridlet.
Figure 12:
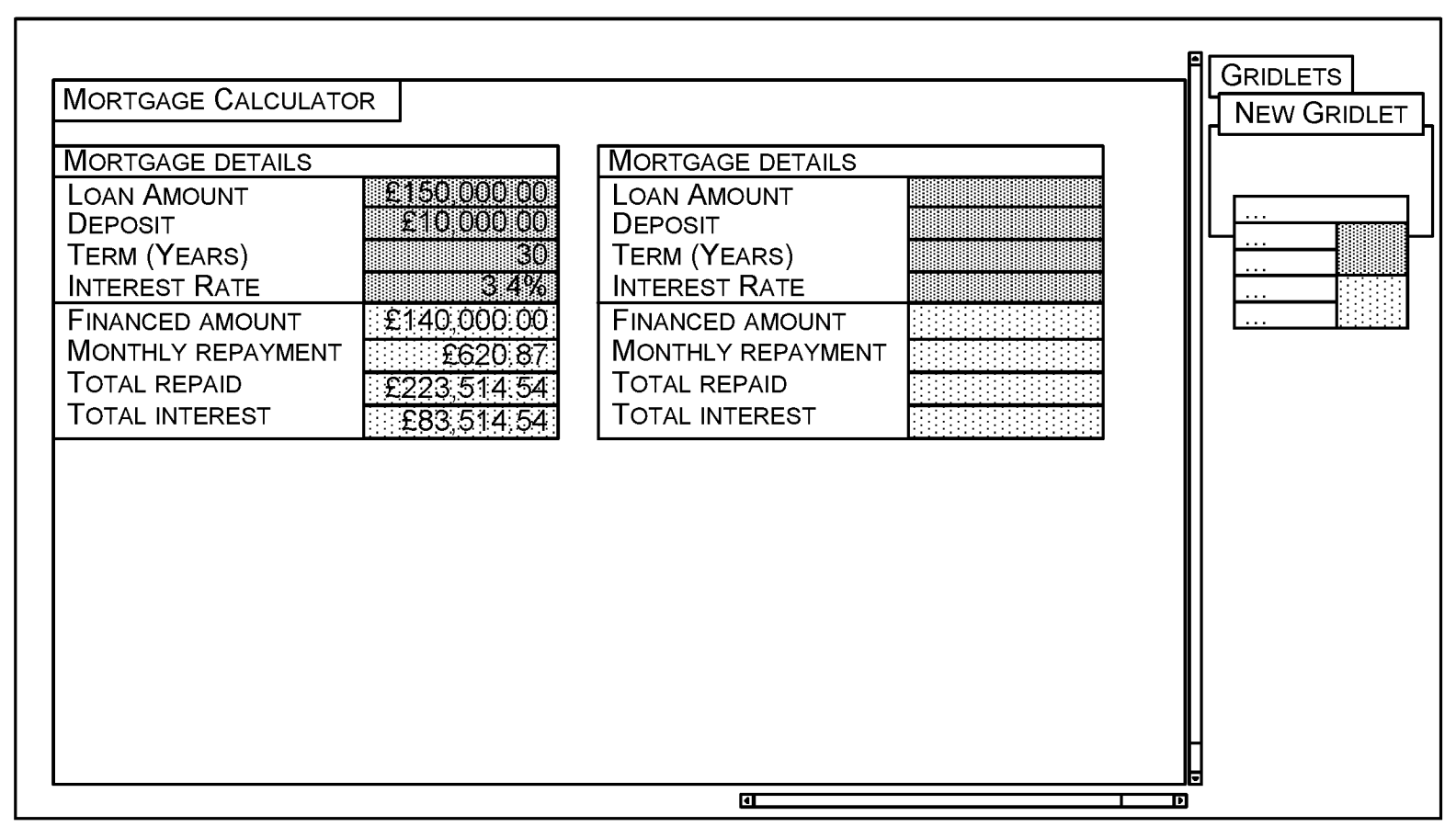
Figure 13:
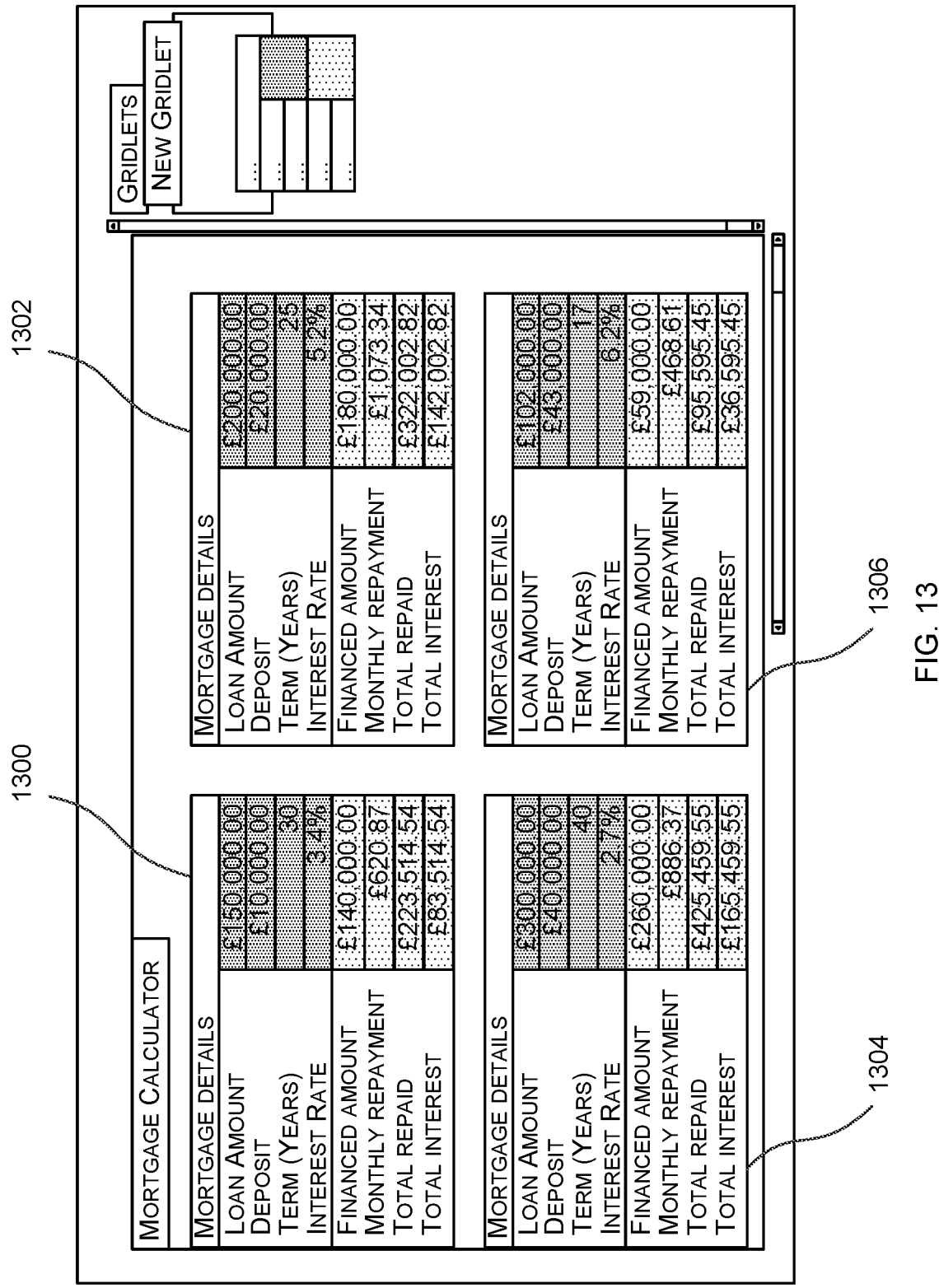
FIG. 13 is a schematic diagram of an areas of a spreadsheet with content and of three instances of a gridlet.

FIGS. 11 to 13 illustrate a process of using a GUI to create gridlet instances.

FIG. 11 is a schematic diagram of a graphical user interface showing a user instantiating an instance of a gridlet. A user selects a gridlet icon for a mortgage repayment calculator from a menu and drags the gridlet icon to a destination range on a spreadsheet. In some cases the destination range has been selected by using a cursor. In other cases the user drag the gridlet icon onto the grid, and the spreadsheet application computes and displays a preview 1102 of the space the gridlet would occupy if the user "dropped" the gridlet by letting go of the mouse button. The preview 1102 acts in a similar way to a shadow of a gridlet icon enabling the user to "skim" the preview across the grid by dragging the icon around on the grid and then letting go when the user has found a suitable spot for the gridlet instance. The user drops the gridlet icon and an instance of the gridlet populates the destination range as indicated in FIG. 12. FIG. 12 is a schematic diagram of the spreadsheet showing an input range having the original mortgage calculator and also showing an instance of the mortgage calculator gridlet.

FIG. 13 is a schematic diagram of an the spreadsheet of FIG. 12 after the user has created two more instances of the mortgage repayment calculator gridlet. In this case there is the original mortgage calculator 1300, and three instances of the mortgage calculator gridlet 1302, 1304, 1306. If a user makes an edit to the formatting, or values or formulas of the original mortgage calculator 1300 then the edits carry over to the three instances of the mortgage calculator gridlet 1302, 1304, 1306 as explained above.

In an example, a computer implemented method comprises: receiving user input selecting a gridlet icon associated with a gridlet, where a gridlet is formatting, values and formulas of an area of cells of a spreadsheet, together with a specification of at least some of the cells where local modifications are possible and at least some of the cells where local modifications are not possible; receiving user input placing the gridlet icon at a location on a spreadsheet of a spreadsheet application executed by the computer implemented method; populating at least part of the spreadsheet with the formatting, values and formulas of the gridlet to form an instance of the gridlet.

In some examples the computer implemented method comprises receiving user input at the gridlet instance and editing the gridlet instance according to the user input only if the user input is associated with the cells where local modifications are possible.

Figure 14:
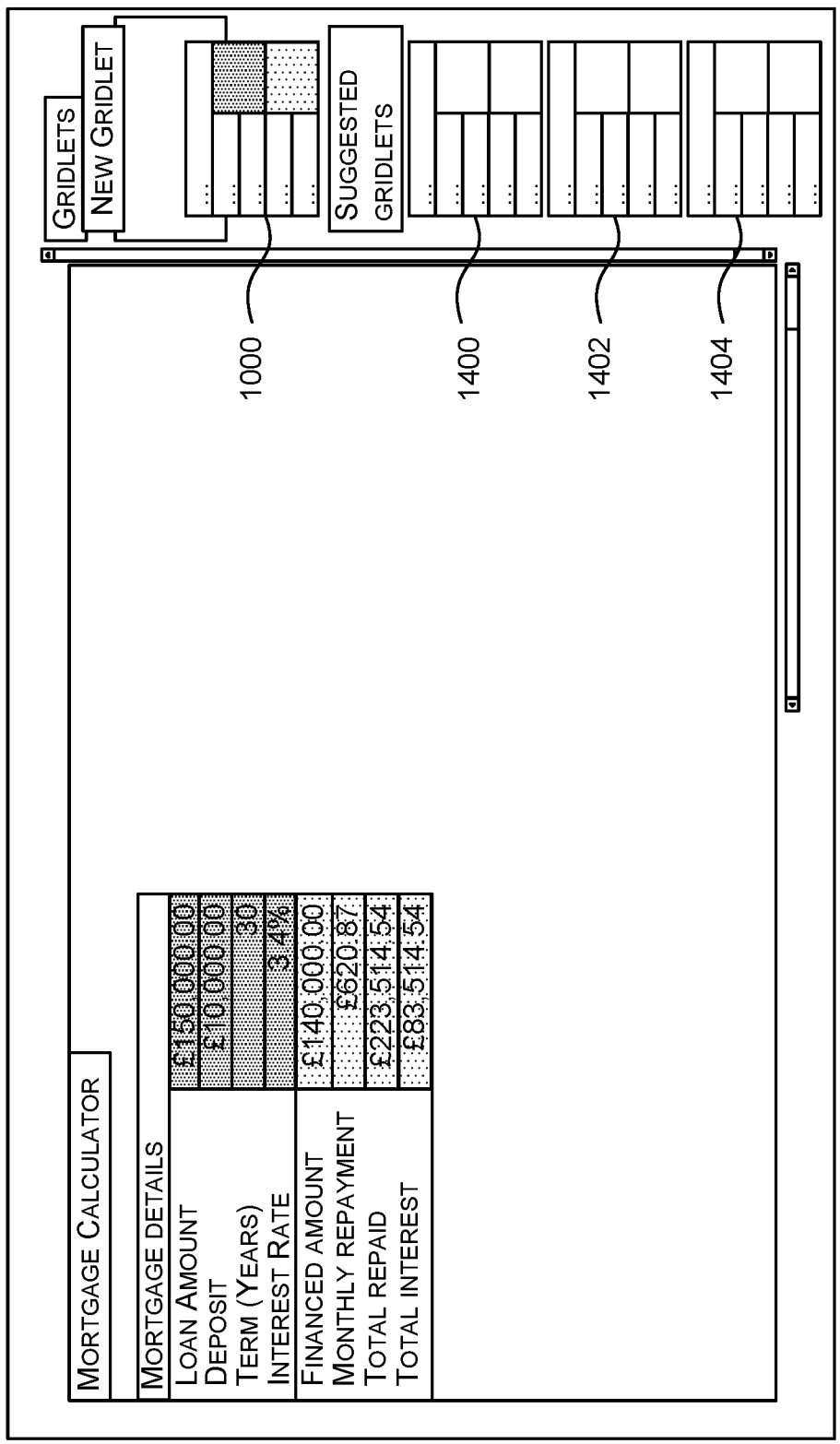
FIG. 14 shows a graphical user interface of a spreadsheet application with a gridlet menu having suggested gridlets.

FIG. 14 shows a graphical user interface of a spreadsheet application with a gridlet menu having icons representing suggested gridlets 1400, 1402, 1404 from a library of available gridlets for different tasks. The gridlets suggested in the menu are ranked according to predicted intent of the user where the intent of the user is predicted using a trained machine learning system having been trained on historical data of user operation of the spreadsheet application with the reuse component.

Figure 15:
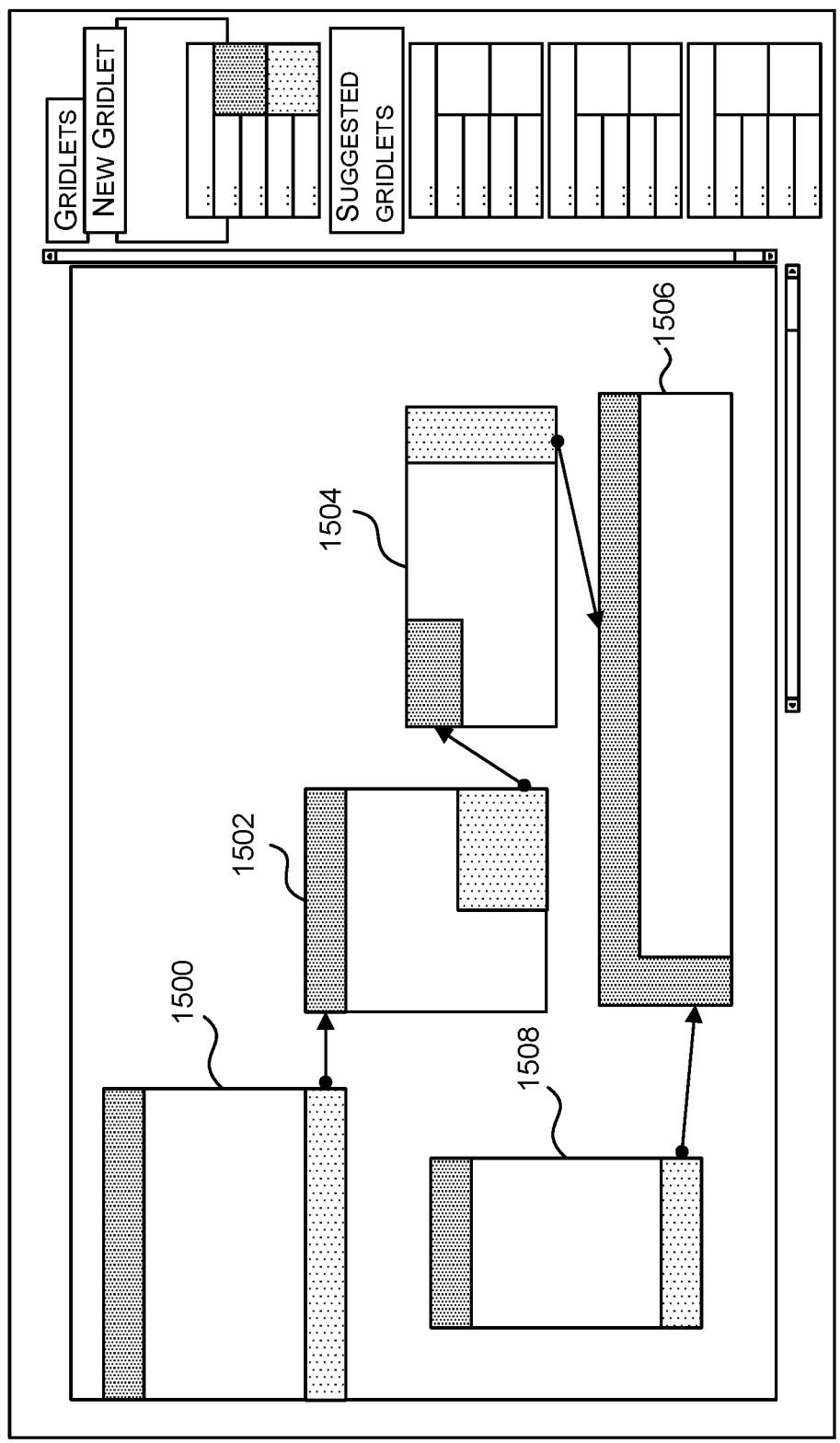
FIG. 15 shows examples of gridlet-only sheets.

FIG. 15 shows a gridlet-only sheet. The reuse component enables the spreadsheet application to generate gridlet-only sheets. A gridlet-only sheet is a spreadsheet which only comprises a gridlet instance, or only comprises multiple gridlet instances connected to each other. Gridlet-only sheets are compact and enable memory saving as well as saving of computational resources. Gridlet-only sheets also reduce complexity for end users.

In the example of FIG. 15 the single gridlet-only sheet is a spreadsheet that only has gridlet instances. The gridlet instances are optionally linked as indicated by the arrows in FIG. 15 such as a range of one or more cells of a first gridlet instance are an input range for one or more cells of a second gridlet instance.

An embodiment where a gridlet instance is specified using a formula is now given.

Gridlets enable live copy-paste-modify in spreadsheets. A pasted region is locally modified without severing the link to the source region. Gridlets are live in that any changes in the source automatically propagate to a pasted copy. Hence gridlets reduce the time, effort, and error-proneness in many common spreadsheet activities.

In some examples, a gridlet is expressed, complete with its formatting and formulas, as a formula situated in a cell a:

$$G(r, a_1, V_1, \ldots, a_n, F_n)$$

The above formula is expressed in words as, a gridlet G acts to copy range r, modify cells $a_i$ with formulas $F_i$, and paste the computed array in cell a where it may spill below and to the right. Consider the following example:

| Source sheet | | |
| --- | --- | --- |
| A | B | C |
| "Edge" | "Len." | |
| "a" | 3 | B2^2 |
| "b" | 4 | B3^2 |
| "c" | =SQRT(C4) | =C2 + C3 |

| Evaluated sheet | | |
| --- | --- | --- |
| A | B | C |
| "Edge" | "Len." | |
| "a" | 3 | 9 |
| "b" | 4 | 16 |
| "c" | 5 | 25 |

The table computes and displays a Pythagorean triple, with intermediate calculation spread across many cells. To reuse the table a user creates a gridlet by inserting a G formula in cell A6 as follows.

| Evaluated sheet | | | |
|---|---|---|---|
| | A | B | C |
| . | . | . | . |
| . | . | . | . |
| . | . | . | . |
| 6 | "Edge" | "Len." | |
| 7 | "a" | 7 | 49 |
| 8 | "b" | 24 | 576 |
| 9 | "c" | 25 | 625 |

| Source sheet | | | |
|---|---|---|---|
| | A | B | C |
| . | . | . | . |
| . | . | . | . |
| . | . | . | . |
| 6 | =G(A1: C4, B2, 7, B3, 24) | | |
| 7 | | | |
| 8 | | | |
| 9 | | | |

The formula in A6 is interpreted as: compute the source range A1:C4 with B2 bound to 7, and B3 bound to 24.

Three new spreadsheet primitives are used to implement G and these are: GRID, VIEW, and UPDATE. These new spreadsheet primitives are explained in more detail below.

In an example, the following syntax is used for a core calculus of the spreadsheet application.

A1-style column $N ::= A|...|Z|AA|AB|...$ name $m, e, \in \mathbb{N}_1$

Address $a, b ::= Nm$

Range $r ::= a_1 : a_2$

Read-value $R ::= \epsilon|c|ERR|\{R_{i,j}^{i\in 1 .. m, j\in 1 .. n}\}$

Write-vaule $W ::= R|r$

Formula $F ::= W|f(F_1, \ldots, F_n)$ ($f$ function name)

Sheet $S ::= [\alpha_1 \mapsto F_i^{i\in 1 .. n}](\alpha_i$ distinct and no $F_i = \epsilon)$ Grid $\gamma ::= [\alpha_1 \mapsto R_i^{i\in 1 .. n}](\alpha_i$ distinct)

Let a and b range over A1-style addresses, written $Nm$, composed from a column name N and row index m. A column name is a base-26 numeral written using the symbols A . . . Z. A row index is a decimal numeral written as usual. Let m and n range over positive natural numbers which denote row or array indices. Assume a locale in which rows are numbered from top to bottom, and columns from left to right, so that A1 is the top-left cell of the sheet. Use the terms address and cell interchangeably. Let r range over ranges that are pairs of addresses that denote a rectangular region of a grid. Modern spreadsheet systems do not restrict which corners of a rectangle are denoted by a range but will automatically normalise the range to represent the top-left and bottom-right corners. Assume that all ranges are written in the normalised form such that range B1:A2 does not occur; instead, the range is denoted A1:B2.

Let R range over read-values and W range over write-values. A read-value is either the blank value, a constant c, an error ERR, or a two-dimensional array $\{R_{i,j}^{i\in 1 \cdots m, j\in 1 \cdots n}\}$. Write $\{R_{i,j}^{i\in 1 \cdots m, j\in 1 \cdots n}\}$ as short for array literal $\{R_{1,1}, \ldots, R_{1,n}; \ldots; R_{m,1}, \ldots, R_{m,n}\}$. A write-value W is either a read-value or a range r.

Let F range over formulas. A formula is either a write-value W or a function application $f(F_1, \ldots, F_n)$, where f ranges over names of pre-defined worksheet functions such as SUM or PRODUCT.

Let S range over sheets; a sheet is a partial function from addresses to formulas that has finite domain. Write [ ] to denote the empty map, and write $S[a \mapsto F]$ to denote the extension of S to map address a to formula F, potentially shadowing an existing mapping. The maximum numbers of rows or columns imposed by some implementations is not used. Each finite S represents an unbounded sheet that is almost everywhere blank: a cell a is blank to mean that a is not in the domain of S.

Let $\gamma$ range over grids; a grid is a partial function from addresses to read-values that has finite domain.

The read-write value dichotomy corresponds to the distinction spreadsheet languages make between what may be written to a cell, and what may be read from a cell. We make this behaviour explicit in the operational semantics defined in FIG. 2; here we consider a small example.

Let $S \stackrel{def}{=} [A1 \mapsto 41, A2 \mapsto A1 + 1, A3 \mapsto A2]$

The formula for address A3 is the range A2, short for A2:A2. This formula will evaluate to the write-value A2, but this is not the value that would be read from address A3. Instead, the value that is read is the content of address A2 which is the value 42. The intuitive relationship between read-values and write-values is that write-values dereference to read-values.

The operational semantics of the core calculus, which consists of four inductively-defined big-step evaluation relations, are given below together with auxiliary definitions.

$cs(N_1 m_1 : N_2 m_2) = N_1 m_1 :: \{m_2 - m_1 + 1, N_2 - N_1 + 1\}$ $N_m + (i, j) = (N + j - 1)(m + i - 1)$

Formula evaluation: $S \vdash F \Downarrow W$ $$\frac{S \vdash F_i \Downarrow W_i \quad S \vdash W_i ! R_i \quad [\![f]\!](R_1, \ldots, R_n) = R}{S \vdash f(F_1, \ldots, F_n) \Downarrow R}$$

$S \vdash W \Downarrow W$

Range dereferencing $S \vdash W ! R$ $$\frac{S \vdash a \Downarrow R}{S \vdash a : a ! R} \quad S \vdash R ! R$$

$$\frac{a_1 \neq a_2 \quad cs(a_1 : a_2) = a :: \{m, n\} \quad \forall i \in 1 .. m,}{j \in 1 .. n. S \vdash a + (i, j) : a + (i, j) ! R_{i,j}}$$
$$S \vdash a_1 : a_2 ! \{R_{i,j}^{i\in 1 .. m, j\in 1 .. n}\}$$

Address evaluation: $S \vdash a \Downarrow R$ $$\frac{S(a) = F \quad S \vdash F \Downarrow W \quad S \vdash W ! R}{S \vdash a \Downarrow R} \quad \frac{a \notin dom(S)}{S \vdash a \Downarrow \epsilon}$$

-continued

Sheet evaluation: $S \Downarrow \gamma$ $$S \Downarrow \gamma \stackrel{def}{=} \forall\, a \in dom(S). S \vdash a \Downarrow \gamma(a)$$

Formula Evaluation

The relation $S \vdash F \Downarrow W$ means that in sheet S, formula F evaluates to write-value W. A value W evaluates to itself. A function application f(F1, ..., Fn) evaluates each of its arguments and dereferences them, producing a series of read-values. The application evaluates to a read-value R if the result of applying $[\![f]\!]$ to the dereferenced arguments is R, where $[\![f]\!]$ is the underlying semantics of f, a total function on read-values.

Range Dereferencing

The relation $S \vdash W!R$ means that in sheet S, write-value W dereferences to read-value R. A read-value R dereferences to itself. A single cell range a:a dereferences to value R if address a evaluates to R in the context of sheet S. A multiple cell range a1:a2 dereferences to an array of the same dimensions, where each value in the array is obtained by dereferencing the corresponding single cell within the range. Write cs(a1:a2) to denote the operation that maps a range to the corresponding corner-size notation a::{m, n}, where a is the top-left corner, m is the number of rows in the range, and n is the number of columns in the range. Write a+(i, j) to denote the address offset to the right and below a by i−1 rows and j−1 columns. Both cs(a1:a2) and a+(i, j) are defined above.

Address Evaluation

The relation $S \vdash a \Downarrow R$ means that in sheet S, reading from address a produces read-value I. If address a maps to formula F in sheet S, then evaluating a first evaluates F to the write-value W and then dereferences W to the read-value R.

Sheet Evaluation

The relation $S \Downarrow \gamma$ means that sheet S evaluates to grid $\gamma$ and the relation is defined by point-wise evaluation of each address in the sheet.

An example grid calculus is now given comprising a higher-order calculus with sheets as values. There are four key interactions happening in the invocation of a gridlet. First, select the content in the grid that is to be modified; second, apply the selected modifications or updates; third, calculate the grid using the modified content; fourth and finally, project the calculated content into the grid. These capabilities are added to a spreadsheet application using three constructs:

GRID Evaluates to the current sheet.

UPDATE Modifies a sheet-value by associating a formula to an address.

VIEW Evaluates a given range in a sheet-value to an array.

Using these constructs gridlets are implemented, for example:

$$G(A1: B3, B1, 7, B2, 24) \stackrel{def}{=}$$
$$\text{VIEW(UPDATE(UPDATE(GRID, } B1, 7), B2\ 24), A1: B3)$$

Formatting omitted from this example grid calculus for clarity. Details of the grid calculus are now given.

The grid calculus does not require modification of existing rules; it adds formula evaluation rules for the new constructs, and evaluation relations for views.

Syntax

Let x range over formula identifiers. Let F range over formulas which may additionally be identifiers x, LET(x, $F_1, F_2$) which binds the result of evaluating $F_1$ to x in $F_2$, GRID which captures the current sheet, UPDATE($F_1, F_2, F_3$) which updates a formula binding in a sheet-value, and VIEW($F_1, F_2$) which extracts an evaluated range from a sheet-value. Let R range over read-values which may additionally be a sheet-value $\langle S \rangle$. Let V range over views; a view is a sheet with a range, denoted (S, r). A view range r delimits the addresses to be computed in sheet S.

Formula evaluation: S, $\omega \vdash F \Downarrow W$, D A formula LET(x, $F_1, F_2$) evaluates in the standard way. Choose not to dereference the write-value obtained by evaluating formula $F_1$ so that LET can provide a limited form of named ranges.

A formula GRID evaluates to a sheet-value that captures the current sheet.

A formula UPDATE($F_1, F_2, F_3$) updates a formula binding in a sheet-value.

If reading formula $F_1$ produces sheet-value $\langle S_1 \rangle$, evaluating formula $F_2$ produces range a:a, then UPDATE($F_1, F_2, F_3$) evaluates to the sheet-value where a is bound to $F_3$ in $S_1$, denoted $\langle S_1[a \mapsto F_3] \rangle$.

A formula VIEW($F_1, F_2$) evaluates a sheet-value and extracts a range. If reading formula $F_1$ produces sheet-value $\langle S_1 \rangle$, and evaluating formula $F_2$ produces range r, then VIEW($F_1, F_2$) evaluates to the read-value obtained by evaluating view (S, r). Dependency tracking is used to prevent spill cycles and captures dependence between values of addresses: the value of a spill root should not depend on the value of an address in the spill area. In contrast, sheet-values depend on the formula of an address in the containing sheet, but not the value of an address in the containing sheet. For example:

$$\text{Let } S \stackrel{def}{=} [A1 \mapsto \text{VIEW(UPDATE(GRID, } A1, 10), A2), A2 \mapsto A1]$$

Sheet S evaluates to grid [A1 $\mapsto$ 10, A2 $\mapsto$ 10]. What are the dependencies of each address? The value of A2 in the grid depends on the value of A1 in the grid. In contrast, the value of A1 in the grid does not depend on the value of A2 in the grid. This is because evaluating the formula in A1 constructs a private grid from which the value of A2 is obtained. However, A1 does depend on the formula of A2 in the containing grid. The semantics only considers value dependence, therefore the dependency set of A1 is ∅—the address has no dependence on values in the containing grid.

Formula dependence is used for efficient recalculation, though the semantics does not model that and uses dependency tracking to prevent spill cycles. If an address depends on the value of another address bound in a sheet, then it also depends on the formula of that address. The converse is not true in the presence of sheet-values.

Single Spill Evaluation:

V, $\omega \Downarrow \gamma$ Evaluation of view (S, r) with oracle $\omega$ is defined in a similar manner as evaluation of sheets, however the induced grid $\gamma$ is limited to the sheet bindings that intersect the range r. There are two consequences that arise from limiting the induced grid. First, only evaluate the bindings in required to evaluate the bindings in r. Second, only roots that are within range r are permitted to spill; any root that is outside r remains as an address containing a collapsed array. There is a difference between an address that holds a collapsed array and a root that is prevented from spilling an array by permit x. The former has a pre-spill and post-spill value that is an array; the latter has a pre-spill value that is an array and a post-spill value that is an error.

Spill Iteration:

$\omega \rightarrow_V \omega'$ The definition of spill iteration for views is the same as spill iteration for sheets, except that view-based single spill evaluation is used.

Final Oracle:

$V \vdash \omega$ final The definition of a final oracle for views is the same as a final oracle for sheets, except that a view-based single spill evaluation is used.

View Evaluation:

$V \Downarrow R$ Evaluating a view (S, r) computes a final oracle for the view and then reads range r in the context of sheet S. View evaluation uses range dereferencing, rather than extracting values from an induced grid, because viewing a range should sample all values in the range—including blank cells. Extracting values from an induced grid only obtains the values for addresses with a binding.

Formulas for Gridlets

Encode the G operator using primitives from the grid calculus.

$$[\![ G(r, a_1, V_1, \ldots, a_n, V_n) ]\!] = \text{VIEW}([\![ (a_1, V_1, \ldots, a_n, V_n) ]\!], r)$$

$$[\![ (a_1, V_1) ]\!] = \text{UPDATE}(\text{GRID}, a_1, V_1)$$

$$[\![ (a_1, V_1, \ldots, a_n+1, V_n+1) ]\!] = \text{UPDATE}([\![ (a_1, V_1, \ldots, a_n, V_n) ]\!], a_n+1, V_n+1)$$

The G operator translates to the VIEW operator, and any bindings translate to a sequence of UPDATE operations. The initial sheet-value is obtained from the context using the GRID operator.

The translation illustrates that G is not higher-order because every application returns the value obtained by evaluating a view on a sheet-value. A language that only provides G does not permit sheet-values to escape and be manipulated by formulas. This is acceptable when emulating copy-paste because a copy is always taken with respect to the top-level sheet.

Figure 16:
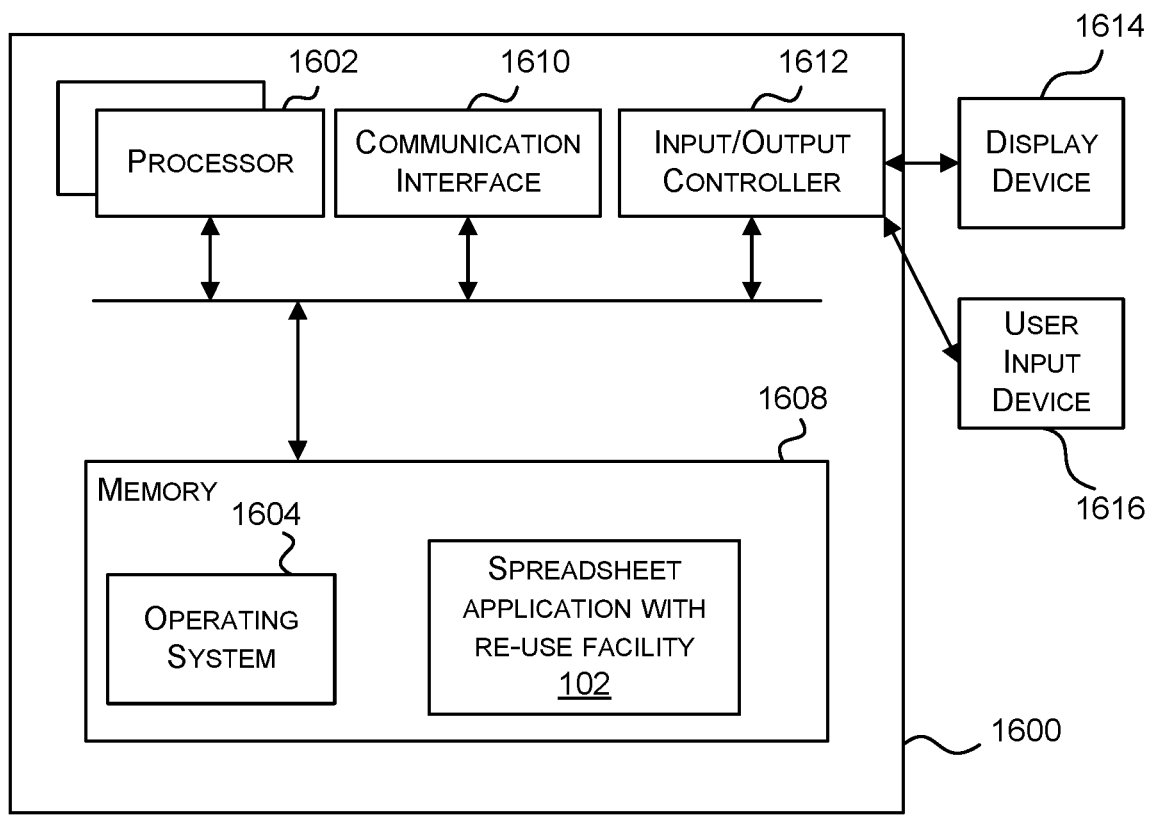
FIG. 16 illustrates an exemplary computing-based device in which embodiments of a spreadsheet application with reuse functionality are implemented.

FIG. 16 illustrates various components of an exemplary computing-based device 1600 which are implemented as any form of a computing and/or electronic device, and in which a spreadsheet application 102 with reuse facility is deployed.

Computing-based device 1600 comprises one or more processors 1602 which are microprocessors, controllers or any other suitable type of processors for processing computer executable instructions to control the operation of the device in order to execute a spreadsheet application with a reuse component such that a user is able to generate gridlets and/or gridlet instances. In some examples, for example where a system on a chip architecture is used, the processors 1602 include one or more fixed function blocks (also referred to as accelerators) which implement a part of the method of any of FIGS. 2 to 5 in hardware (rather than software or firmware). Platform software comprising an operating system 1604 or any other suitable platform software is provided at the computing-based device to enable application software, including the spreadsheet application with reuse facility 102 to be executed on the device.

The computer executable instructions are provided using any computer-readable media that is accessible by computing based device 1600. Computer-readable media includes, for example, computer storage media such as memory 1608 and communications media. Computer storage media, such as memory 1608, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1608) is shown within the computing-based device 1600 it will be appreciated that the storage is, in some examples, distributed or located remotely and accessed via a network or other communication link (e.g. using communication interface 1610).

The computing-based device 1600 also comprises an input/output controller 1612 arranged to output display information to a display device 1614 which may be separate from or integral to the computing-based device 1600. The display information may provide a graphical user interface. The input/output controller 1612 is also arranged to receive and process input from one or more devices, such as a user input device 1616 (e.g. a mouse, keyboard, camera, microphone or other sensor). In some examples the user input device 1616 detects voice input, user gestures or other user actions and provides a natural user interface (NUI). This user input may be used to generate gridlets and/or gridlet instances. In an embodiment the display device 1614 also acts as the user input device 1616 if it is a touch sensitive display device. The input/output controller 1612 outputs data to devices other than the display device in some examples, e.g. a locally connected printing device.

Alternatively or in addition to the other examples described herein, examples include any combination of the following:

A computer-implemented method comprising executing a spreadsheet application so as to display a spreadsheet of cells in tabular form;

receiving user input specifying an input range of cells of the spreadsheet, a destination range of cells of the spreadsheet and a local modification;

storing, at a memory, a representation of the spreadsheet indicating formatting, values and formulas;

computing an update of the representation by applying the local modifications to the representation;

calculating values of cells of the input range of the spreadsheet by using the updated representation;

displaying the calculated values of cells at the destination range. In this way a user is able to reuse areas of a spreadsheet in a simple and efficient manner. The user is easily able to have local modifications to an area of a spreadsheet when it has been reused.

The method described above wherein the representation of the spreadsheet includes an association between the input range of cells, the destination range of cells and the local modification. The association facilitates global edits to be effected, in the case that an edit is to be propagated between reused areas of a spreadsheet.

The method described above comprising receiving an edit at the spreadsheet in the input range of cells and repeating the operations of computing an update of the representation, calculating values of cells of the input range, and displaying the calculated values of cells at the destination range, such that the edit at the spreadsheet in the input range of cells is propagated to the destination range of cells. In this way burden of user input is reduced because a user does not have to manually identify locations to be edited and make the propagations of the edits.

The method described above wherein the edit is an edit to formatting in the input range of cells. Editing formatting is very burdensome for users and having such edits propagate automatically is extremely useful and reduces error.

The method described above wherein the user input is a formula. Having ability to input a formula to express a gridlet is a powerful and efficient way areas of a spreadsheet to be reused. Formulas are succinct and transmittable between entities in an efficient manner with low bandwidth requirements.

The method described above wherein the user input is a plurality of selections at a graphical user interface. The ability to use a graphical user interface as a way of giving the user input enables the technology to be workable by novice users who are unfamiliar with formulas.

The method described above wherein the destination range comprises a single cell and the spreadsheet application comprises array spilling functionality. Efficiency is gained by having a single cell as the destination range since the representation of the gridlet instance is highly compact.

The method of described above comprising repeating the method a plurality of times for different destination ranges and, if an edit is received at one of the destination ranges, computing a decision as to whether the edit is to be applied to each of the destination ranges.

The method described above wherein receiving the user input comprises receiving a selection of a gridlet icon from a menu of available gridlets and receiving a selection of a cell onto which the gridlet icon is dragged.

The method described above wherein the spreadsheet application is configured to generate at least one spreadsheet comprising only the destination range of cells.

The method described above wherein the spreadsheet application comprises at least one spreadsheet being a gridlet-only sheet comprising only one or more gridlet instances.

The method described above wherein displaying the calculated values of the cells at the destination range comprises, if a conflict exists where the destination range already comprises at least one value, then generating an error message.

The method described above wherein displaying the calculated values of the cells at the destination range comprises, potentially introducing a cyclic dependency where a gridlet instance depends on the destination range it occupies, and avoiding the spill cycle by recording the cells required to compute the value and ensuring none of the recorded cells are in the area.

An apparatus comprising
a processor executing a spreadsheet application so as to display a spreadsheet of cells in tabular form;
a user interface which receives user input specifying an input range of cells of the spreadsheet, a destination range of cells of the spreadsheet and a local modification;
a memory storing a representation of the spreadsheet indicating formatting, values and formulas;
the processor configured to: compute an update of the representation by applying the local modifications to the representation; calculate values of cells of the input range of the spreadsheet by using the updated representation; and display the calculated values of cells at the destination range.

A computer-readable medium storing instructions which when executed on a computer implement the following operations:
executing a spreadsheet application so as to display a spreadsheet of cells in tabular form;
receiving user input specifying an input range of cells of the spreadsheet, a cell of the spreadsheet and a local modification;
storing, at a memory, a representation of the spreadsheet indicating formatting, values and formulas;
computing an update of the representation by applying the local modifications to the representation;
calculating values of cells of the input range of the spreadsheet by using the updated representation;
displaying the calculated values of cells at the destination cell using array spilling.

The computer readable medium described above wherein the representation of the spreadsheet includes an association between the input range of cells, the destination range of cells and the local modification.

The computer readable medium described above wherein the operations comprise, receiving an edit at the spreadsheet in the input range of cells and repeating the operations of computing an update of the representation, calculating values of cells of the input range, and displaying the calculated values of cells at the destination range, such that the edit at the spreadsheet in the input range of cells is propagated to the destination range of cells.

The computer readable medium described above wherein the edit is an edit to formatting in the input range of cells.

The computer readable medium described above wherein the user input is a formula.

The computer readable medium described above wherein the user input is a plurality of selections at a graphical user interface.

In an example, a computer implemented method comprises: receiving user input selecting a gridlet icon associated with a gridlet, where a gridlet is formatting, values and formulas of an area of cells of a spreadsheet, together with a specification of at least some of the cells where local modifications are possible and at least some of the cells where local modifications are not possible; receiving user input placing the gridlet icon at a location on a spreadsheet of a spreadsheet application executed by the computer implemented method; populating at least part of the spreadsheet with the formatting, values and formulas of the gridlet to form an instance of the gridlet.

In some examples the computer implemented method comprises receiving user input at the gridlet instance and editing the gridlet instance according to the user input only if the user input is associated with the cells where local modifications are possible.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computer-implemented method comprising:
executing a spreadsheet application so as to display a spreadsheet of cells in tabular form;
receiving user input specifying
an input range of cells that is a first area of the spreadsheet,
a destination range of cells that is a second area of the spreadsheet in which a copy of the input range of cells is to be placed, and
a local modification,
wherein the local modification includes an edit to at least one cell of the destination range of cells;
creating, at a memory, a representation of the spreadsheet, wherein the representation of the spreadsheet indicates formatting, values and formulas of the spreadsheet;
computing an updated representation at least by applying the local modification to the input range of cells of the representation;
calculating values of cells of the input range of cells of the spreadsheet by using the updated representation;
displaying the calculated values of cells at the destination range of cells;
after displaying the calculated values of cells at the destination range of cells, receiving an edit made within the input range of cells; and
propagating the edit made within the input range of cells to the calculated values of cells displayed at the destination range of cells including overwriting, by the local modification at the destination range of cells, the edit upon the edit being in a location that corresponds to the local modification.

2. The method of claim 1 wherein the representation of the spreadsheet includes an association between the input range of cells, the destination range of cells and the local modification.

3. The method of claim 1 wherein propagating the edit made within the input range of cells comprises and repeating said computing an updated representation, said calculating values of cells of the input range of cells, and said displaying the calculated values of cells at the destination range of cells, such that the edit made within the input range of cells is propagated to the destination range of cells.

4. The method of claim 3 wherein the edit made within the input range of cells is an edit to formatting in the input range of cells.

5. The method of claim 1 wherein the user input is a formula.

6. The method of claim 1 wherein the user input is a plurality of selections at a graphical user interface.

7. The method of claim 1 wherein the destination range of cells comprises a single cell and the spreadsheet application comprises array spilling functionality.

8. The method of claim 1 further comprising receiving a plurality of different destination ranges of cells and, if an edit is received at a cell of the input range of cells, computing a decision as to whether the edit is to be applied to each of the plurality of different destination ranges of cells.

9. The method of claim 1 wherein receiving the user input comprises receiving a selection of a gridlet icon from a menu of available gridlets and receiving a selection of a cell onto which the gridlet icon is dragged.

10. The method of claim 1 wherein the spreadsheet application is configured to generate at least one representation of the spreadsheet wherein all cells of the at least one representation are occupied by the destination range of cells.

11. The method of claim 1 wherein the spreadsheet application comprises at least one spreadsheet being a gridlet-only sheet comprising only one or more gridlet instances.

12. The method of claim 1 wherein displaying the calculated values of the cells at the destination range of cells comprises, if a conflict exists where the destination range of cells already comprises at least one value, then generating an error message.

13. An apparatus comprising:
a processor executing a spreadsheet application so as to display a spreadsheet of cells in tabular form;
a memory;
a user interface which receives user input specifying
an input range of cells that is a first area of the spreadsheet,
a destination range of cells that is a second area of the spreadsheet in which a copy of the input range of cells is to be placed, and
a local modification,
wherein the local modification includes an edit to at least one cell of the destination range of cells;
creating, at the memory, a representation of the spreadsheet,
wherein the representation of the spreadsheet indicates formatting, values and formulas of the spreadsheet; and
the processor configured to:
compute an updated representation at least by applying the local modification to the input range of cells of the representation;
calculate values of cells of the input range of cells of the spreadsheet by using the updated representation;
display the calculated values of cells at the destination range of cells;
after the display of the calculated values of cells at the destination range of cells, receive an edit made within the input range of cells; and
propagate the edit made within the input range of cells to the calculated values of cells displayed at the destination range of cells including overwriting, by the local modification at the destination range of cells, the edit upon the edit being in a location that corresponds to the local modification.

14. A computer storage medium storing instructions which when executed on a computer implement the following operations:
executing a spreadsheet application so as to display a spreadsheet of cells in tabular form;
receiving user input specifying
an input range of cells that is a first area of the spreadsheet,
a destination range of cells that is a second area of the spreadsheet in which a copy of the input range of cells is to be placed, and
a local modification,
wherein the local modification includes an edit to at least one cell of the destination range of cells;
creating, at a memory, a representation of the spreadsheet,
wherein the representation of the spreadsheet indicates formatting, values and formulas of the spreadsheet;
computing an updated representation at least by applying the local modification to the input range of cells of the representation;
calculating values of cells of the input range of cells of the spreadsheet by using the updated representation;
displaying the calculated values of cells at the destination range of cells using array spilling;
after displaying the calculated values of cells at the destination range of cells, receiving an edit made within the input range of cells; and
propagating the edit made within the input range of cells to the calculated values of cells displayed at the destination range of cells including overwriting, by the local modification at the destination range of cells, the edit upon the edit being in a location that corresponds to the local modification.

15. The computer storage medium of claim 14 wherein the representation of the spreadsheet includes an association between the input range of cells, the destination range of cells, and the local modification.

16. The computer storage medium of claim 14 wherein propagating the edit made within the input range of cells comprises repeating the operations of computing an updated representation, calculating values of cells of the input range of cells, and displaying the calculated values of cells at the destination range of cells, such that the edit made within the input range of cells is propagated to the destination range of cells.

17. The method of claim 1, further comprising receiving user input selecting at least one cell of the destination range of cells as editable.

18. The method of claim 1, further comprising receiving user input selecting at least one cell of the destination range of cells as not editable.

19. The method of claim 1, further comprising:
receiving an edit at a cell of the input range of cells; and
computing a decision as to whether the edit is to be globally applied to all of a plurality of different destination ranges of cells, wherein computing the decision comprises at least one of asking a user or automatically globally applying the edit to all of the plurality of different destination ranges of cells according to at least one of a user profile, configuration settings, or historical data.

20. The apparatus of claim 13, wherein the representation of the spreadsheet includes an association between the input range of cells, the destination range of cells, and the local modification.

* * * * *